(12) United States Patent
Bonny

(10) Patent No.: US 11,888,378 B1
(45) Date of Patent: Jan. 30, 2024

(54) ELECTRIC DRIVE ASSEMBLY

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 517 days.

(21) Appl. No.: 17/135,582

(22) Filed: Dec. 28, 2020

Related U.S. Application Data

(63) Continuation-in-part of application No. 16/457,243, filed on Jun. 28, 2019, now Pat. No. 10,876,596.

(60) Provisional application No. 62/692,256, filed on Jun. 29, 2018.

(51) Int. Cl.
| | |
|---|---|
| *H02K 11/20* | (2016.01) |
| *H02K 5/22* | (2006.01) |
| *H02K 7/102* | (2006.01) |
| *H02K 7/116* | (2006.01) |
| *H02K 11/25* | (2016.01) |
| *H02K 11/40* | (2016.01) |
| *H02K 11/215* | (2016.01) |

(52) U.S. Cl.
CPC ............. *H02K 5/225* (2013.01); *H02K 7/102* (2013.01); *H02K 7/116* (2013.01); *H02K 11/215* (2016.01); *H02K 11/25* (2016.01); *H02K 11/40* (2016.01); *H02K 2211/03* (2013.01)

(58) Field of Classification Search
CPC ........... F16H 1/2863; F16H 1/46; F16H 2057/02034; F16H 57/02; H02K 11/215; H02K 2211/03; H02K 7/003; H02K 7/083; H02K 7/102; H02K 7/116; H02K 7/1185; H02K 21/14; F16D 65/18; F16D 65/186; F16D 2121/16; F16D 2121/22; F16D 2121/64; F16D 55/225
USPC ......................................................... 475/342
See application file for complete search history.

(56) References Cited

U.S. PATENT DOCUMENTS

| | | | |
|---|---|---|---|
| 5,240,462 A | 8/1993 | Mochizuki et al. | |
| 9,033,849 B2 | 5/2015 | Klein et al. | |
| 9,810,109 B2 | 11/2017 | Pluta et al. | |
| 10,006,321 B2 | 6/2018 | Simpson et al. | |
| 10,161,503 B2 | 12/2018 | Taylor et al. | |
| 10,274,049 B2 | 4/2019 | Shinohara et al. | |
| 10,377,037 B2 | 8/2019 | Du et al. | |

(Continued)

FOREIGN PATENT DOCUMENTS

EP    3285377    2/2018

OTHER PUBLICATIONS

AMP Circular Connectors for Commercial Signal & Power Applications, Product catalog, Tyco Electronics, Jul. 2007, 51 pp.

(Continued)

*Primary Examiner* — Leslie A Nicholson, III
(74) *Attorney, Agent, or Firm* — Neal, Gerber & Eisenberg LLP

(57) ABSTRACT

An electrical connector for a reduction drive assembly includes a connector body and a plurality of pins disposed within the connector body. The plurality of pins include one or more motor pins to conduct power to an electric motor, one or more brake pins to conduct power to an electric brake coil, and one or more sensor pins electrically connected to a sensor board for control of the electric motor.

22 Claims, 25 Drawing Sheets

(56) References Cited

U.S. PATENT DOCUMENTS

| | | | |
|---|---|---|---|
| 10,899,224 B2 | 1/2021 | Huang | |
| 11,658,551 B2 * | 5/2023 | Schulz | B60K 25/00 |
| | | | 310/66 |
| 11,705,786 B1 * | 7/2023 | Bonny | H02K 11/33 |
| | | | 310/71 |
| 2003/0181284 A1 | 9/2003 | Chen | |
| 2005/0223727 A1 | 10/2005 | Funahashi et al. | |
| 2006/0010844 A1 | 1/2006 | Angott | |

OTHER PUBLICATIONS

Circular connectors in M17 to M58, Product catalog, Phoenix Contact, 2015, 48 pp.

Kollmorgen Servo Systems Catalog, 2011, 86 pp.

L1019 male, Specification sheet, Shang hai Higo Electronic Technology Co., Ltd., Feb. 2020, 1 p.

Military Standard, Insert Arrangements, Department of Defense, United States of America, Apr. 1992, 266 pp.

PMSG Series, Product catalog, www.ebike.heinzmann.com, Downloaded on Oct. 21, 2014, 8 pp.

Roe, "E-Bike Motors, Explained," Electric Bicycle Motor Guide, Jan. 14, 2019, 12 pp.

SOURIAU Mixed Power and Signal Circular Connectors, Specification sheet, Mouser Electronics, 2011, 1 p.

U.S. Appl. No. 17/135,522, filed Dec. 28, 2020, 78 pp.

U.S. Appl. No. 17/135,547, filed Dec. 28, 2020, 78 pp.

U.S. Appl. No. 17/135,603, filed Dec. 28, 2020, 77 pp.

U.S. Appl. No. 17/135,615, filed Dec. 28, 2020, 77 pp.

X-Lok Connector, Datasheet, Amphenol LTW Technology Co., Ltd., Date unknown but believed to be at least as early as Dec. 2019, 24 pp.

* cited by examiner

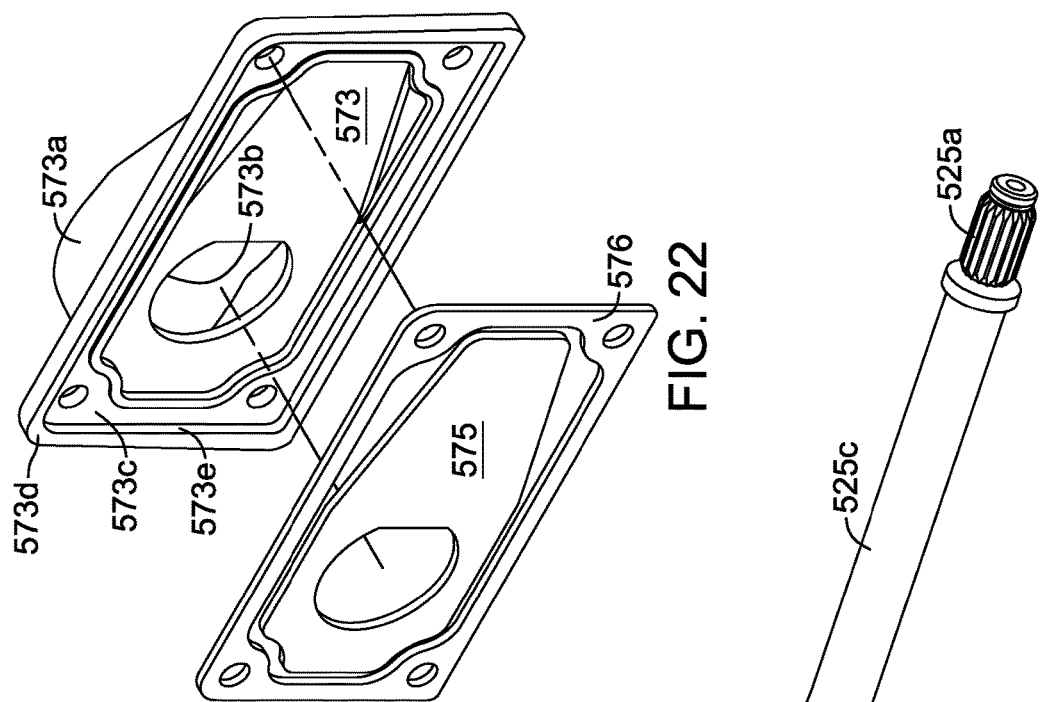
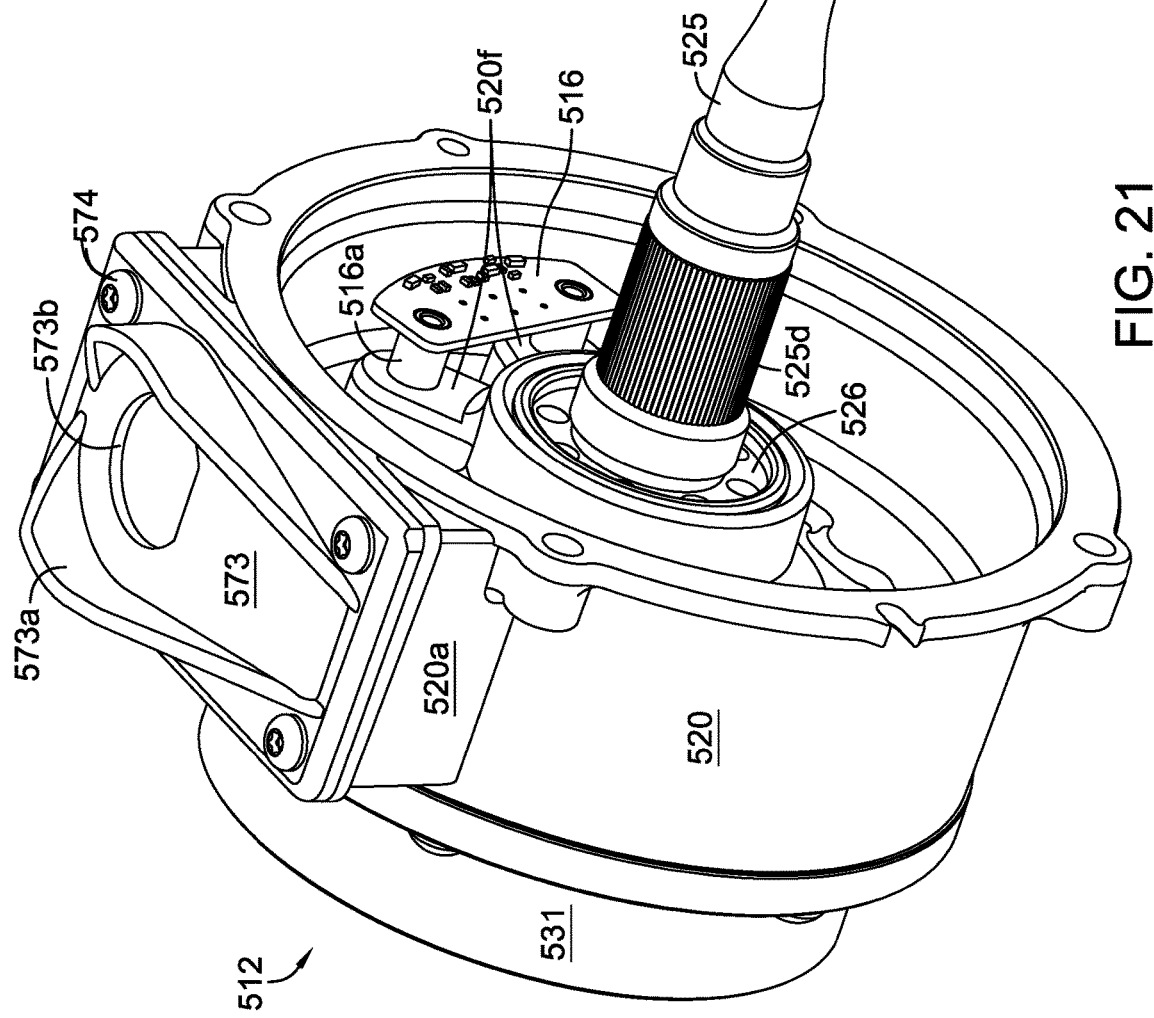
FIG. 22
FIG. 21

| PIN # | DESCRIPTION |
|---|---|
| 1 | PHASE A |
| 2 | PHASE B |
| 3 | PHASE C |
| 4 | BRAKE +V |
| 5 | BRAKE GND |
| 6 | TEMP |
| 7 | HALL A |
| 8 | HALL B |
| 9 | HALL GND |
| 10 | HALL C |
| 11 | HALL +V |
FIG. 26
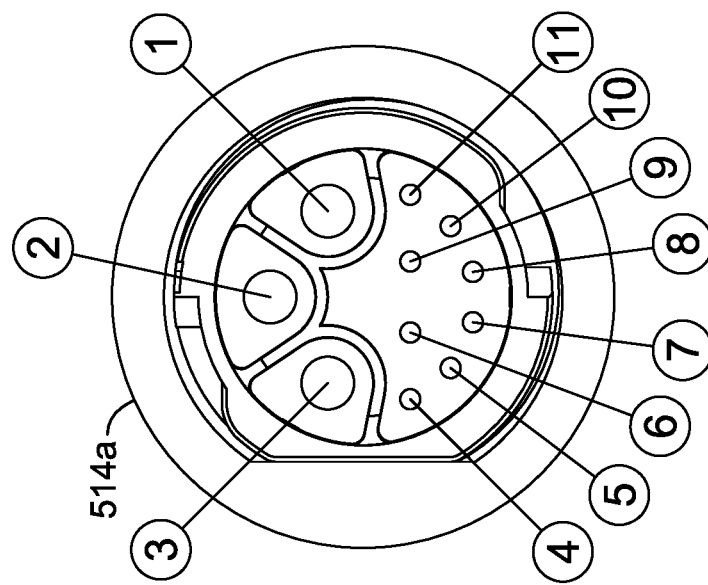
FIG. 25
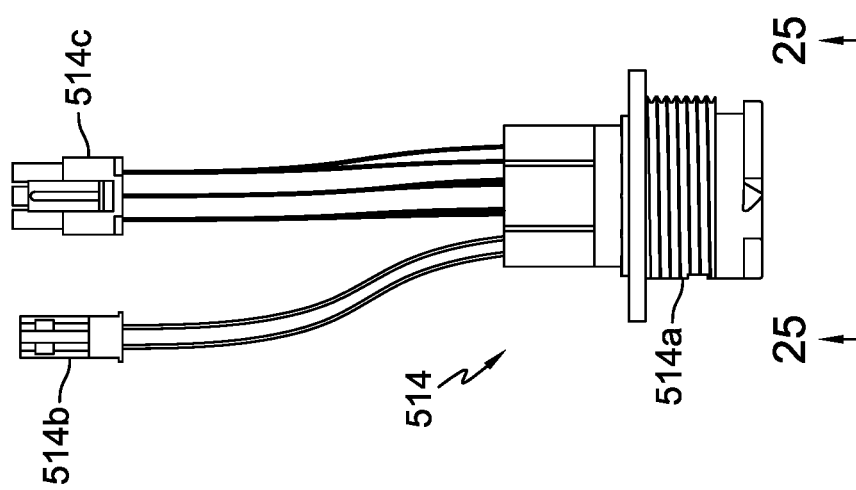
FIG. 24

ELECTRIC DRIVE ASSEMBLY

CROSS-REFERENCE

This application is a continuation-in-part of U.S. patent application Ser. No. 16/457,243, filed on Jun. 28, 2019, which claims the benefit of U.S. Provisional Patent App. No. 62/692,256, filed on Jun. 29, 2018. These applications are incorporated herein by reference in their entirety.

BACKGROUND OF THE INVENTION

This application relates to an electric planetary reduction drive incorporating an electric motor having a gear drive. Such a drive may be used for applications such as a ground drive for a scissors lift, boom lift or the like, although other applications are possible.

SUMMARY OF THE INVENTION

A compact planetary gear drive for an electric motor is disclosed herein. This design provides for a compound planetary gear assembly providing a summative reduction of the rotational speed of the electric motor output to an output hub. One benefit of the disclosed design is a reduced overall size and length of the drive. By way of example only, the planetary gear assembly is disposed entirely in the output hub to reduce envelope size. A further benefit of the drive disclosed herein is a limit on the amount of rollback in a vehicle in which the drive is used as a ground drive, which may be accomplished by limiting backlash in the drive. Various improvements for accomplishing these objectives are disclosed herein. Further benefits and features of the disclosure are set forth herein.

A better understanding of the invention will be obtained from the following detailed descriptions and accompanying drawings, which set forth illustrative embodiments that are indicative of the various ways in which the principles of the invention may be employed.

BRIEF DESCRIPTION OF THE DRAWINGS

FIG. 21 is a perspective view of a brake assembly, housing components, and certain electrical components of the electric motor assembly of FIG. 12.

FIG. 22 is a perspective view of an electrical compartment cover and seals of the electric motor assembly of FIG. 12.

FIG. 24 is an external elevational view of an electrical connector of the electric motor assembly of FIG. 12.

FIG. 25 is a top plan view showing a pin layout of the electrical connector of FIG. 24.

FIG. 26 is a chart listing the pins of the pin layout shown in FIG. 25.

DETAILED DESCRIPTION OF THE DRAWINGS

Figure 1:
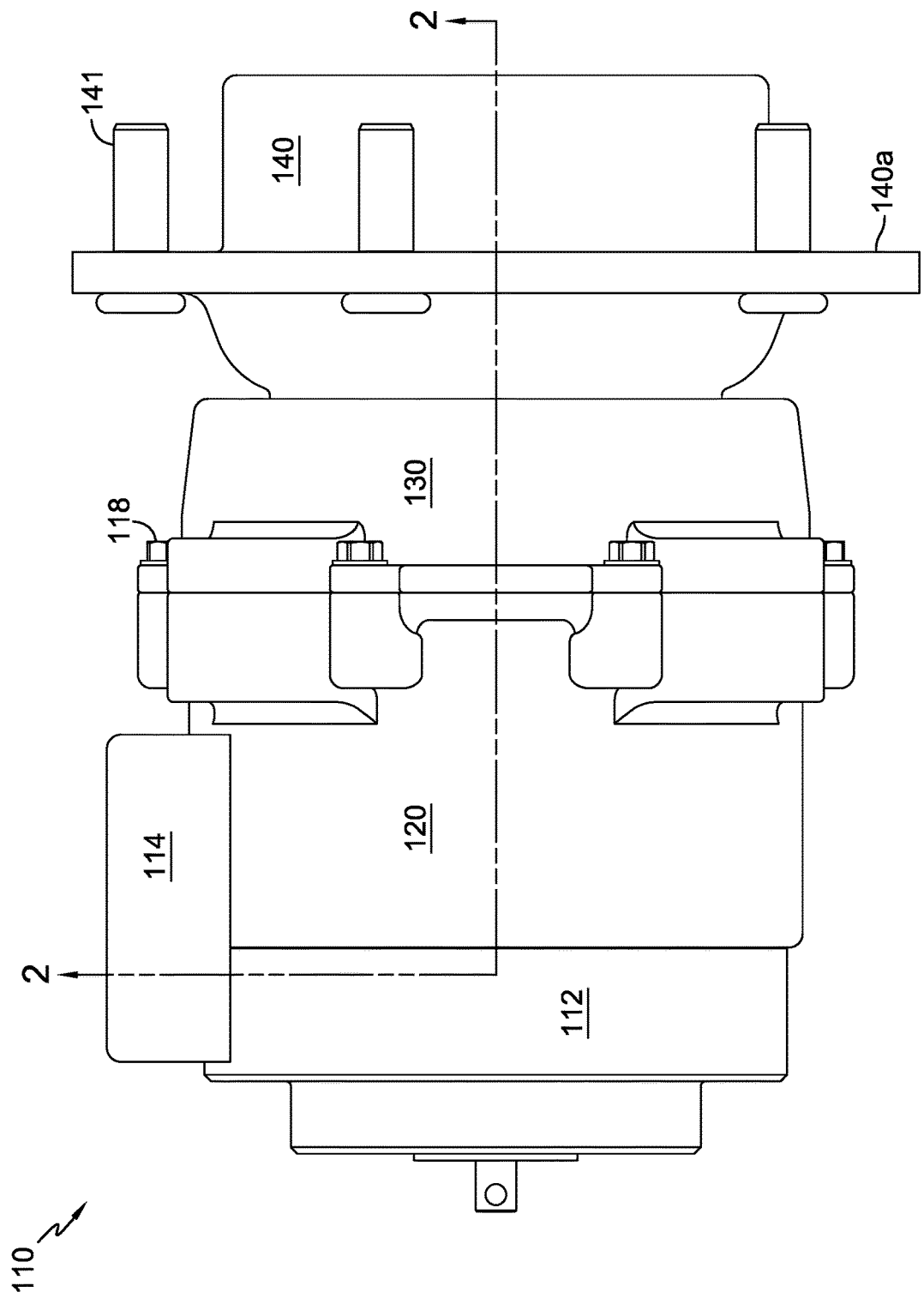
FIG. 1 is an external elevational view of an electric motor assembly including a planetary gear drive, in accordance with the disclosure herein.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

An electric planetary reduction drive 110 as depicted in FIG. 1 includes a housing comprising a main housing 130 joined to motor housing 120 via fasteners 118 and using a seal 119. A spring biased electric brake 112 and power and control module 114 are attached to motor housing 120, and splines 125b are provided on output shaft 125 to engage electric brake 112. As will be explained in more detail, output hub 140 also serves as a planetary reduction housing, and includes standard wheel mounting fasteners 141 and wheel mounting flange 140a such that it can serve as a wheel hub.

Figure 2:
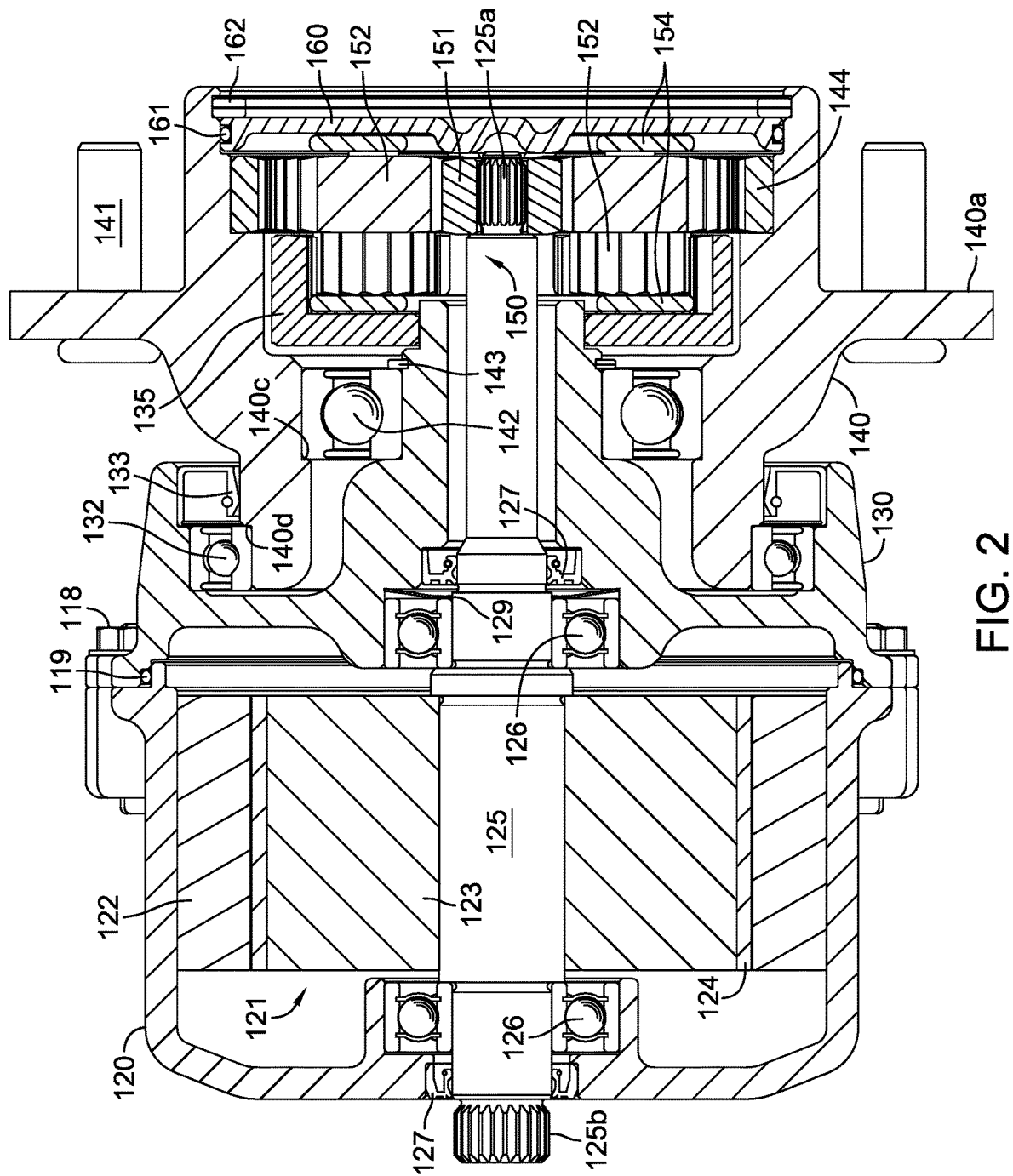
FIG. 2 is a cross-sectional view of the electric motor assembly of FIG. 1, along the line 2-2. It will be understood that certain elements of the assembly, such as brake 112 and power and control module 114 seen in FIG. 1, are not depicted in FIG. 2 for clarity.
Figure 3:
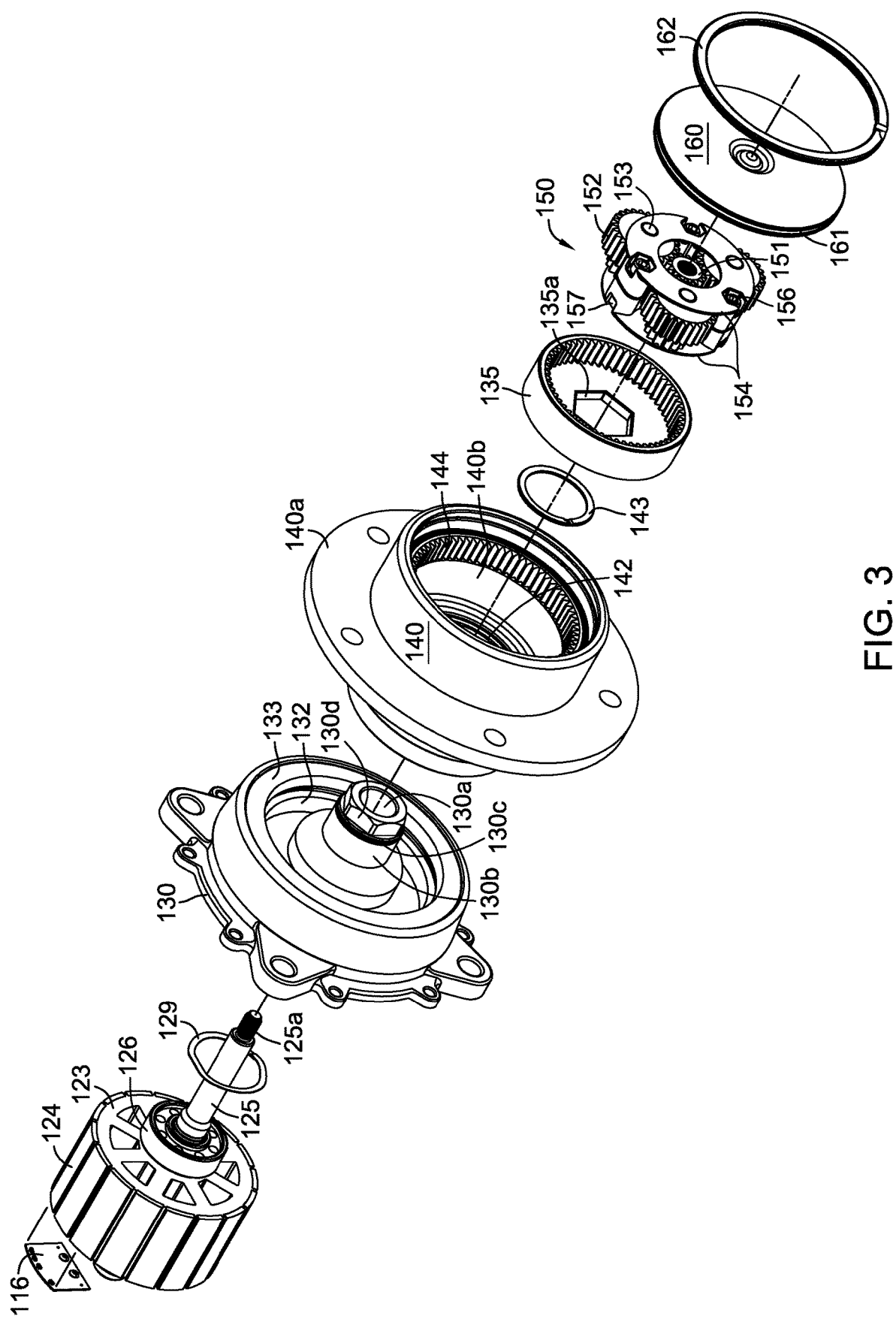
FIG. 3 is an exploded view of certain components of the electric motor assembly of FIG. 1.

As shown most clearly in FIGS. 2 and 3, a brushless electric motor 121 is disposed in motor housing 120, and comprises stator 122, rotor 123 and magnets 124. An output shaft 125 extends through motor 121 and is supported by a pair of bearings 126. Seals 127 are also provided adjacent the bearings 126. Splines 125a are provided on output shaft 125 to engage sun gear 151 as discussed below. As noted above, control module 114 and brake 112 are not depicted in the cross-sectional view of FIG. 2. Hall effect board 116 is also mounted to a surface of motor housing 120 in a manner to be appropriately located with regard to magnets 124. Wave spring 129 is disposed between bearing 126 and main housing 130 to provide an axial biasing force to the rotor 123 to keep rotor 123 biased towards Hall effect board 116 at start-up.

The structure of main housing 130 can be seen most clearly in FIG. 3. Main housing 130 includes a through opening 130a for output shaft 125. Seal 133 is disposed between output hub 140 and main housing 130. Bearing 132 is disposed in main housing 130. Retaining ring 143 is mounted in groove 130c and maintains ball bearing 142 in the proper location on bearing land 130b. It will be seen in FIG. 2 that shoulder 140d engages bearing 132, and shoulder 140c engages bearing 142, in a manner to retain the axial location of output hub 140.

A fixed ring gear 135 having an anti-rotation opening 135a is disposed internal to output hub 140 in a clearance pocket 140b, and mounted on a corresponding anti-rotation form 130d on main housing 130. While a hex is depicted for the anti-rotation forms, it will be understood that other shapes could be used.

Figure 4:
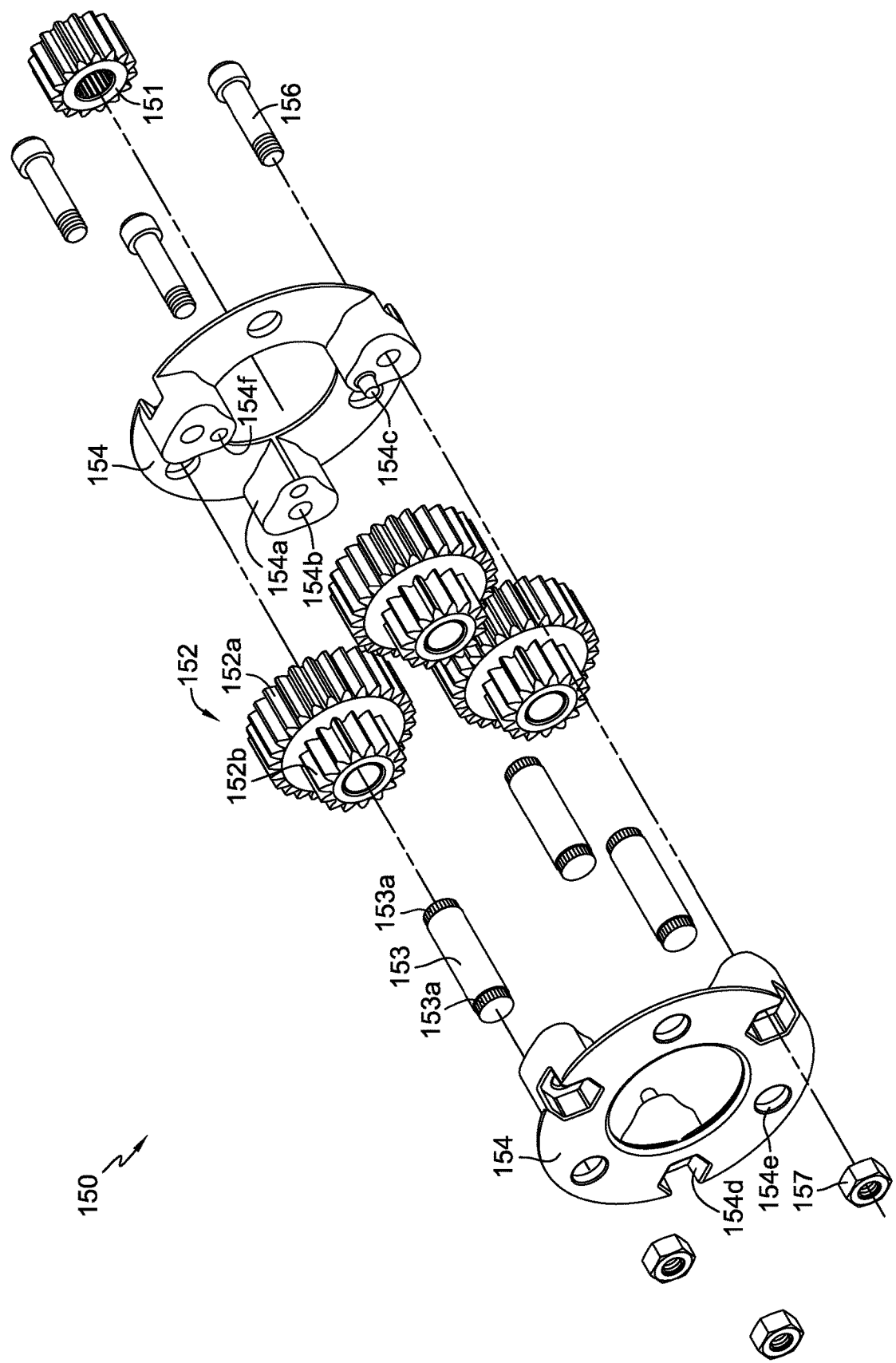
FIG. 4 is an exploded view of certain components of the planetary gear assembly of the electric motor assembly of FIG. 1.

Planetary gear assembly 150 comprises a pair of carrier plates 154 connected via carrier plate screws 156 extending through through-holes 154b and retained by carrier plate nuts 157. A plurality of recesses 154d is provided to accommodate the carrier plate nuts 157 to reduce envelope size for the carrier assembly. A projection pin 154c is formed on one of a plurality of projections 154a on each carrier plate 154 and engages a corresponding projection pin opening 154f on one of the projections 154a on the other carrier plate 154. As shown in FIG. 4, an extra pin opening 154f for the projection pins 154c is provided on one of the projections 154a to improve ease of assembly by allowing assembly in different positions. Sun gear 151 is mounted on output shaft 125 by means of splines 125a. Sun gear 151 drives the plurality of planet gears 152, each of which comprises a first stage gear form 152a and second stage gear form 152b. Planet gears 152 are each mounted on a respective carrier pin 153. Each carrier pin 153 is preferably composed of steel and has an optional raised spline 153a at each end to engage with pin support holes 154e of carrier plates 154. If carrier plates 154 are composed of, for example, aluminum, the raised splines 153a will deform the material adjacent its respective pin support holes 154e during assembly to assist in retaining carrier pins 153 in a non-rotatable fashion to reduce wear.

As seen most clearly in FIG. 2, planetary gear assembly 150 is disposed entirely within output hub 140. Retention plate 160, seal 161 and retaining ring 162 engage a portion of output hub 140 to assist in retaining the planetary gear assembly 150 in output hub 140. Second stage gear forms 152b engage and rotate against fixed ring gear 135, whereas first stage gear forms 152a engage and drive rotating ring gear 144, which is formed on or as part of output hub 140. It will be understood that ring gear 144 could be press fit into output hub 140 to simplify assembly, but it will also be understood that maintaining a proper press fit between ring gear 144 and output hub 140 without slippage under expected torque loads would be difficult. It will also be understood that planetary gear assembly 150 will rotate in the same direction as output shaft 125, whereas planet gears 152 will rotate in the opposite direction, such that planetary gear assembly 150 acts as both a speed reducer and torque amplifier for output hub 140.

Figure 5:
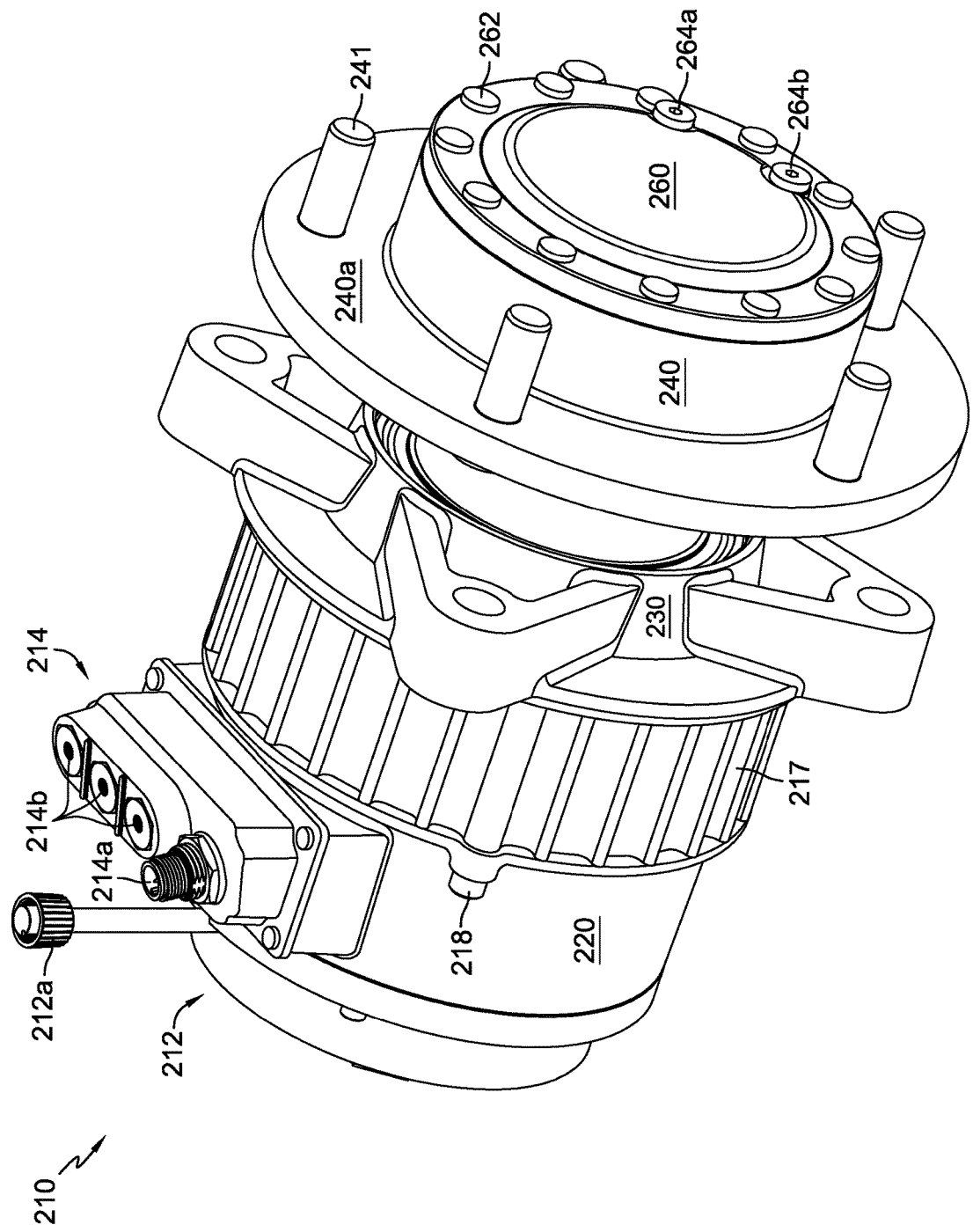
FIG. 5 is a perspective view of an electric motor assembly in accordance with a second embodiment of the disclosure herein.
Figure 6:
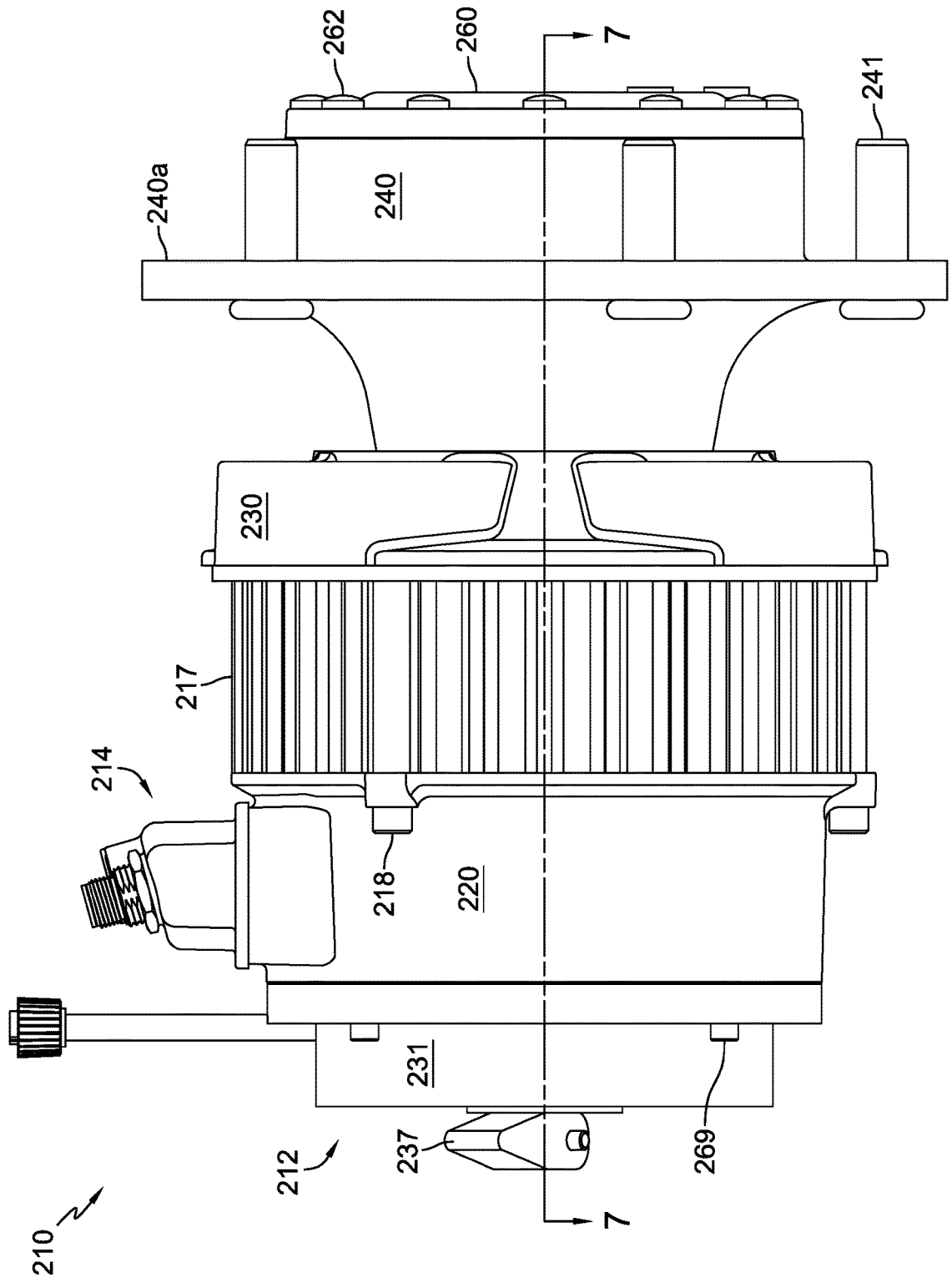
FIG. 6 is an external elevational view of the electric motor assembly of FIG. 5.

A second embodiment of an electric planetary reduction drive 210 is depicted in FIGS. 5-9. As seen in FIG. 5, a housing comprising a main housing 230 is joined to a second housing component 220 and motor stator housing 217 via fasteners 218. An electric brake 212 and power and control module 214 are attached to second housing component 220. Control module 214 includes a connector 214a for connection to a vehicle control system as may be required, and the connector 214a and associated Hall effect board (similar to Hall effect board 116 to which the connector 214a is wired) may be CAN-Bus capable when used with a CAN-Bus system. Power terminals 214b provide the necessary power inputs.

Output hub 240 also serves as a planetary reduction housing, and includes standard wheel mounting fasteners 241 and wheel mounting flange 240a such that it can serve as a wheel hub.

Figure 7:
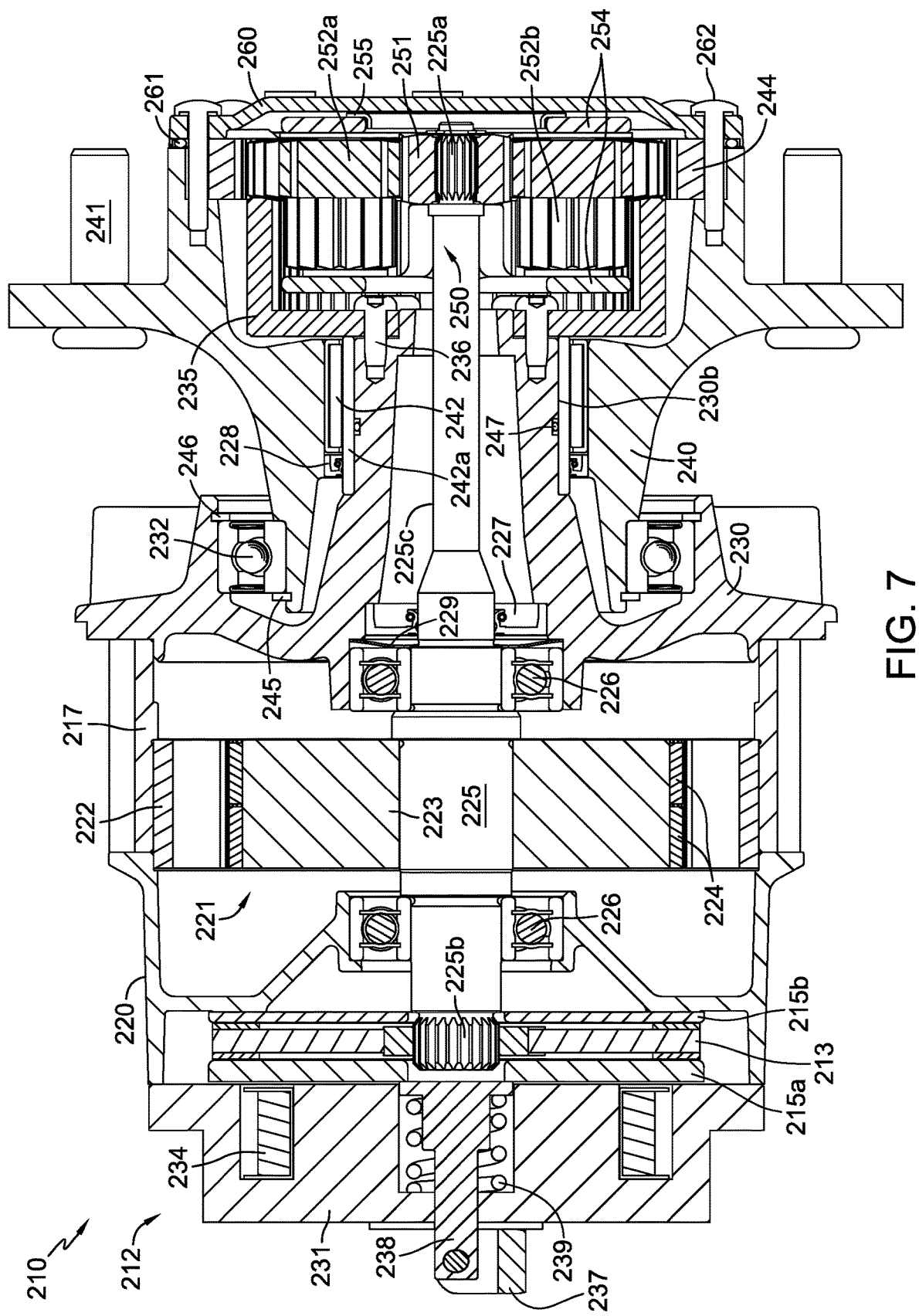
FIG. 7 is a cross-sectional view of the electric motor assembly of FIG. 5, along the line 7-7.
Figure 8:
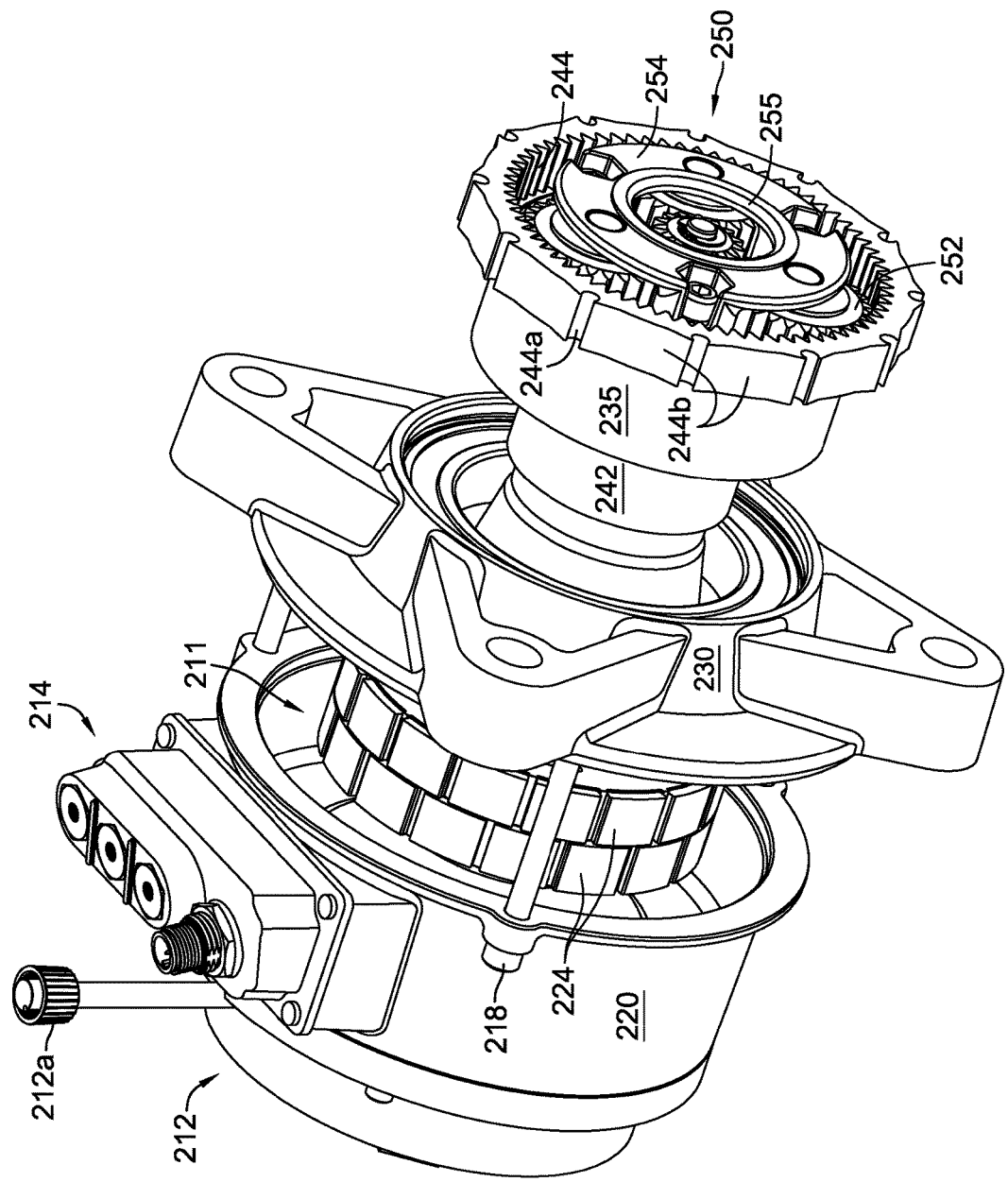
FIG. 8 is a perspective view of the electric motor assembly of FIG. 5, with certain external components removed for clarity.

As shown most clearly in FIGS. 7 and 8, electric motor 221 is disposed in motor stator housing 217 and second housing component 220, and comprises stator 222, rotor 223 and a skewed magnet rotor assembly 211 having skewed magnets 224. Motor stator housing 217 can be a finned aluminum extrusion cut to a length dependent upon the number of laminations combined to form the stator 222. An output shaft 225 extends through electric motor 221 and is supported by a pair of bearings 226. A seal 227 is provided adjacent one of the pair of bearings 226. Splines 225a are provided on output shaft 225 to engage sun gear 251 as discussed below. A Hall effect board (not shown, but similar to Hall effect board 116) is also mounted to a surface of second housing component 220. Wave spring 229 is disposed between one of the pair of bearings 226 and main housing 230 to provide an axial biasing force to the rotor 223 to keep rotor 223 biased towards the Hall effect board at start-up, as discussed above.

Planetary gear assembly 250 comprises a pair of carrier plates 254 connected by means of carrier plate screws 256 and carrier plate nuts 257, and a plurality of carrier pins 253. Raised splines such as splines 153a are optional. Sun gear 251 is mounted on output shaft 225 by means of splines 225a and retaining ring 249. Retaining ring 249 assists in locating sun gear 251 and preventing contact with gear cover 260, described below. Flanged washer 255 is also provided between one of the carrier plates 254 and cover plate 260. Sun gear 251 drives the plurality of planet gears 252, each of which comprises a first stage gear form 252a and second stage gear form 252b, and second stage gear form 252b may be slip fit or press fit into first stage gear form 252a. Planet gears 252 are each mounted on a respective carrier pin 253.

Figure 9:
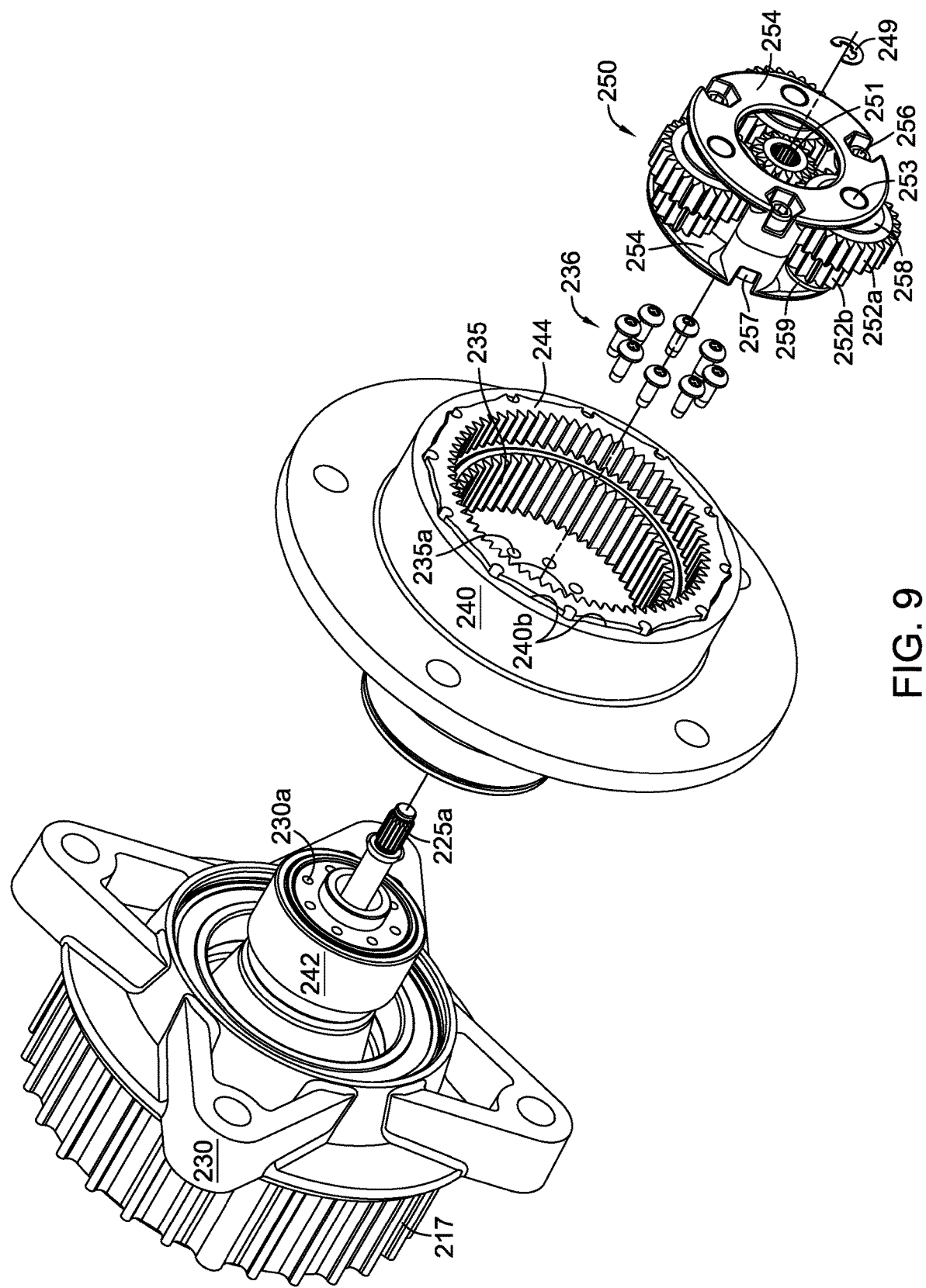
FIG. 9 is a partially exploded perspective view of the electric motor assembly of FIG. 5.

As seen in, e.g., FIGS. 7 and 9, planetary gear assembly 250 is disposed entirely within output hub 240 and comprises a first stage ring gear 244 and a fixed second stage ring gear 235. A difference from the first embodiment lies with the connection of first stage ring gear 244 and output hub 240. Small projections 244b on ring gear 244 with clearance fit into corresponding slots 240b in the output hub 240 can provide an anti-rotation feature but will necessarily add rotational backlash between the ring gear 244 and the output hub 240.

As noted before, it is desirable to minimize backlash, which is generated by various clearances within the system, including clearance at the brake rotor spline 225b, sun gear spline 225a, the mesh of sun gear 251, the mesh of the large planet gear 252a to large ring gear 244 and the mesh of small planet gear 252b to ring gear 235. In the second embodiment, the large ring gear 244 is clamped between gear cover 260 and output hub 240 by means of fasteners 262 extending through fastener recesses 244a formed on ring gear 244. This clamping arrangement allows the use of standard slip fit tolerances while eliminating this additional backlash between ring gear 244 and output hub 240.

Main housing 230 includes spindle 230b and attachment bores 230a for connecting ring gear 235 thereto via openings 235a by means of fasteners 236. This direct connection of ring gear 235 to main housing 230 also eliminates another source of backlash and improves performance.

Second stage gear forms 252b engage and rotate against fixed ring gear 235, whereas first stage gear forms 252a engage and drive rotating first stage ring gear 244, which is attached to and thereby causes rotation of the output hub 240. Thrust washers 258 and 259 are disposed between carrier plates 254 and first stage gear 252a and second stage gear 252b, respectively. It will be understood that planetary gear assembly 250 will rotate in the same direction as output shaft 225, whereas planet gears 252 will rotate in the opposite direction, such that planetary gear assembly 250 acts as both a speed reducer and torque amplifier for output hub 240.

Bearing 232 is disposed between main housing 230 and output hub 240, while needle roller bearing 242 is disposed between output hub 240 and spindle 230b of main housing 230. The inner race 242a of needle roller bearing 242 is retained by ring gear 235. Hub seal 228 and spindle seal 247 are provided to create the necessary seals, and retaining rings 245, 246 are used to assist in retaining proper alignment of the components.

As seen most clearly in FIGS. 5, 6, 7 and 8, electric brake assembly 212 is primarily disposed inside a brake housing compartment defined by second housing component 220 and brake housing 231, which is secured to second housing component 220 by fasteners 269. Brake assembly 212 comprises a brake rotor 213 secured to splines 225b formed on output shaft 225. A pair of stators 215a and 215b is used to provide braking force to brake rotor 213. As seen in FIGS. 5 and 8, an electrical connector 212a connects brake 212 to an external power source and/or control system, and coil 234 is energized to remove the braking force from stators 215a and 215b. When coil 234 is deenergized, brake plunger 238 bears against stator 215a to translate stator 215a in an axial direction toward brake rotor 213, with compression spring 239 providing the bias force. External manual brake release lever 237 is operable to overcome the bias force of compression spring 239 and disengage brake 212.

Output shaft 225 has a portion 225c having a reduced diameter from the rest of the shaft 225. When drive 210 is under load, for example when used as a vehicle drive and the vehicle weight is applied thereto, output hub 240 will deflect with respect to main housing 230 and can flex output shaft 225. The reduced diameter portion 225c of output shaft 225, which is preferably approximately 40% of the main portion, allows such flexing with reduced stress.

Upper oil fill port 264a and lower oil fill port 264b are provided to fill the chamber in which planetary gear assembly 250 is disposed. These fill ports 264a, 264b are located on cover plate 260 to act as drains when output hub 240 is rotated such that they are located at the bottom, and act as level indicators when output hub 240 is rotated such that they are vertically aligned.

Figure 10:
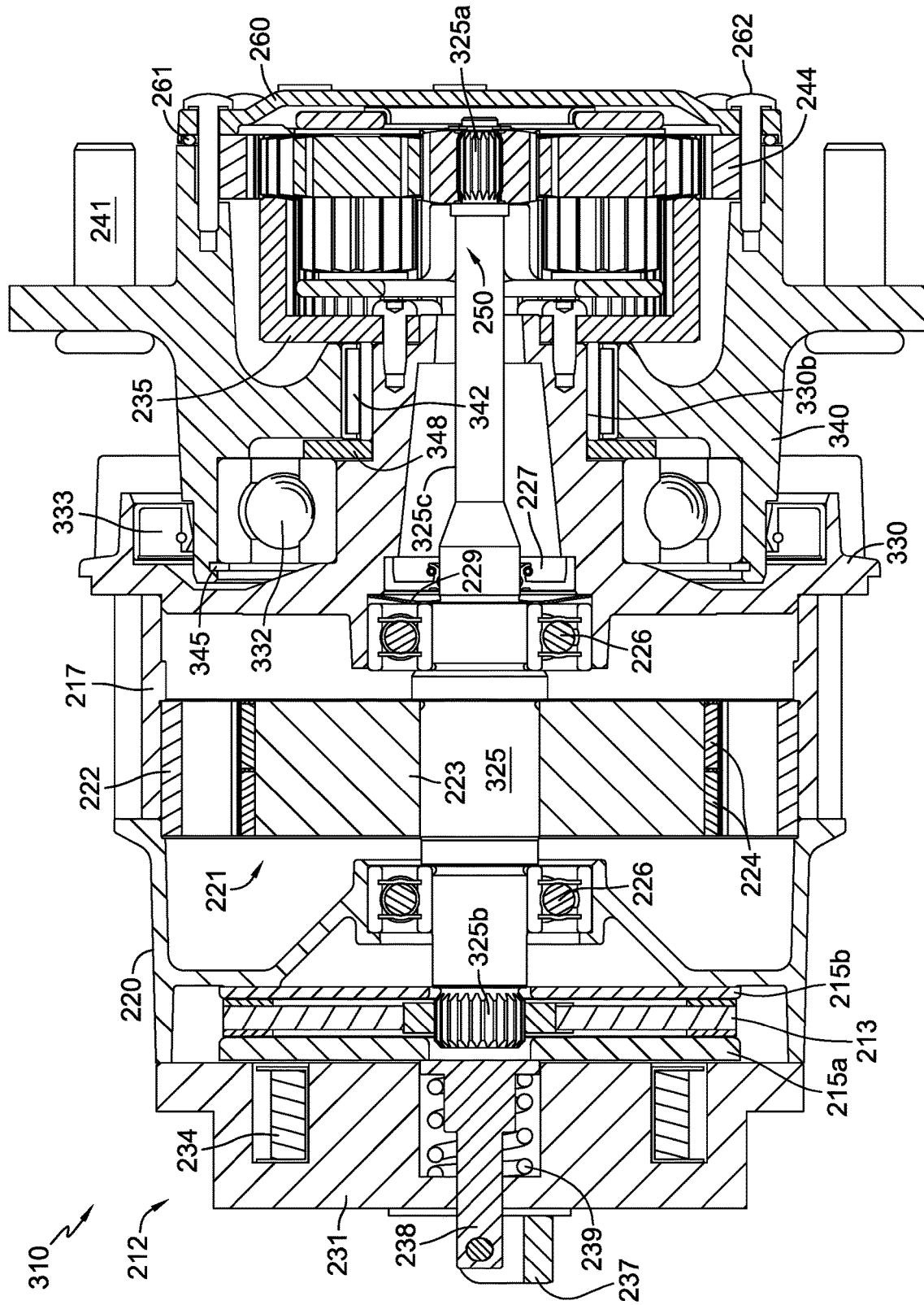
FIG. 10 is a cross-sectional view similar to that of FIG. 7, but depicting an electric motor assembly in accordance with a third embodiment of the disclosure herein.

A third embodiment of an electric planetary reduction drive 310 is depicted in FIG. 10. Elements of this embodiment that are identical or substantially identical with those of the second embodiment are given identical numerals and will not be discussed herein. By way of example only, planetary gear assembly 250 is the same as previously discussed. Spacer or washer 348 bears against the inner races of bearing 332 and needle roller bearing 342 (both of which are located internal to hub 340) to assist in retaining the inner races of bearings 332 and 342 in an axial direction with respect to housing 330. Needle roller bearing 342 is disposed between output hub 340 and spindle 330b. Retaining ring 345 holds bearing 332 axially in place within output hub 340 while seal 333 is located external to the output hub 340, similar to seal 133. This internal positioning of both bearing 332 and needle roller bearing 342, and use of a spacer 348 between the inner race of bearing 332 and needle roller bearing 342, eliminates the need for an equivalent of retainer 246 used in the prior embodiment, wherein bearing 232 was located external to the hub 240 and needle roller bearing 242 was located internal to the output hub 240. This eases assembly, as retainer 246 of the previous embodiment can be challenging to access. Output shaft 325 is modified slightly to accommodate the changes to the shapes of other components, and has a smaller diameter portion 325c as noted previously, a spline 325a to engage the sun gear 251 of planetary gear assembly 250, and a brake spline 325b to engage brake rotor 213 as discussed above.

Figure 11:
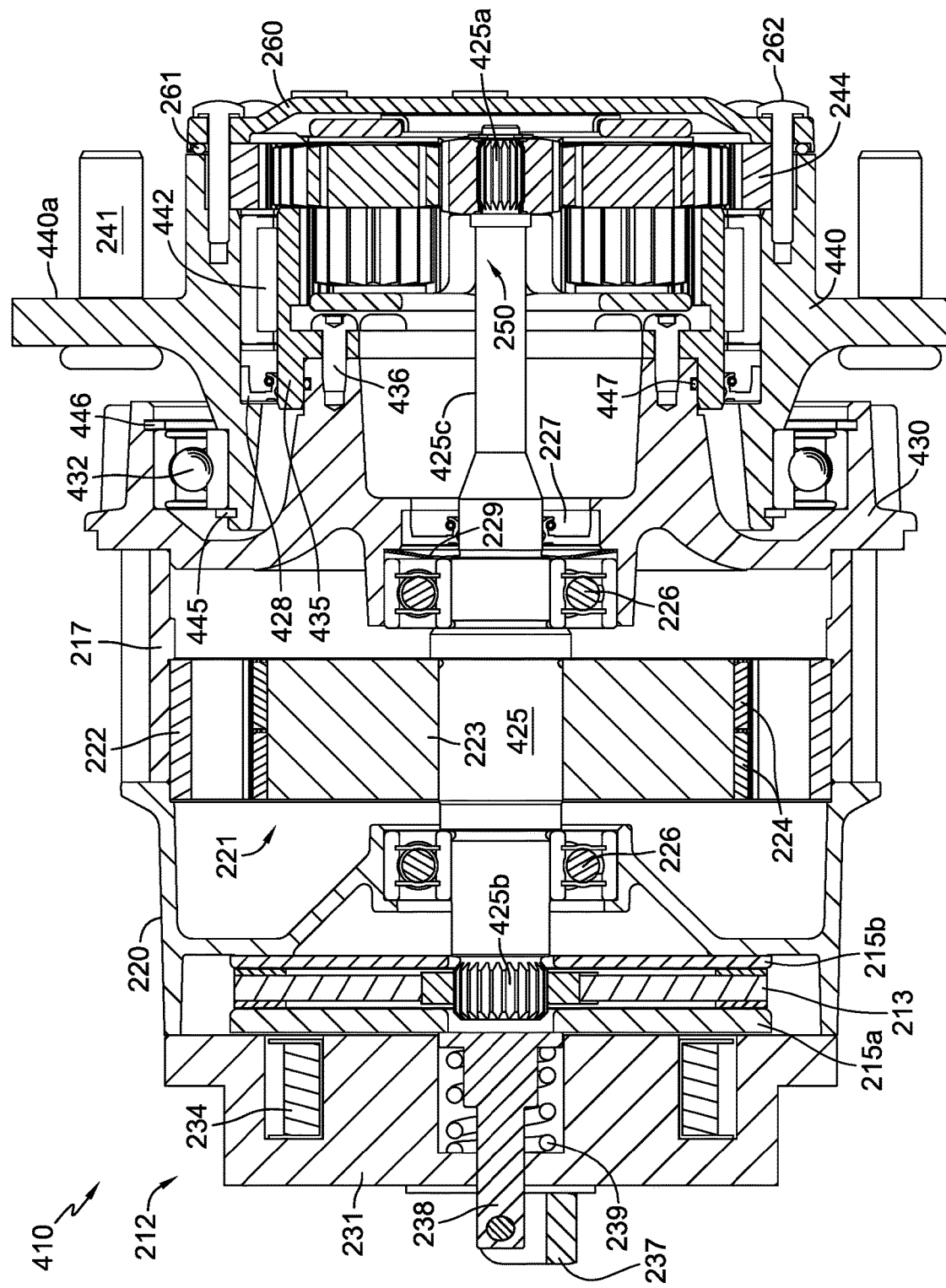
FIG. 11 is a cross-sectional view similar to that of FIG. 7, but depicting an electric motor assembly in accordance with a fourth embodiment of the disclosure herein.

A fourth embodiment of an electric planetary reduction drive 410 is depicted in FIG. 11. As with the third embodiment, elements that are identical or substantially identical with those of the second embodiment are given identical numerals and will not be discussed herein. By way of example only, planetary gear assembly 250 is the same as previously discussed. Motor output shaft 425 is modified slightly to accommodate changes to other components, and comprises a planetary gear spline 425a, a brake spline 425b and a reduced diameter portion 425c. Ring gear bearing 442, which preferably is a needle bearing, is mounted in output hub 440 on the outer diameter of ring gear 435, and output hub 440 thus runs on this ring gear bearing 442 and the outer diameter of ring gear 435. The ball bearing 432 with retaining rings 445 and 446 provides the axial retention between the main housing 430 and the output hub 440. The ring gear 435 is affixed to the main housing 430 with fasteners 436 while the spindle seal 447 and hub seal 428 provide the sealing between the main housing 430 and the output hub 440. As in prior embodiments, output hub 440 includes standard wheel mounting fasteners 241 and wheel mounting flange 440a such that it can serve as a wheel hub. One of skill in the art will realize that the size, number and placement of the fasteners disclosed herein, as well as the selection of the bearings disclosed herein, will vary depending on factors such as the expected load. In this embodiment, outboard bearing 442 is located closer to flange 440a such that bearing 442 is in the load plane of the wheel (not shown) attached to flange 440a, thereby reducing the reaction load on inboard bearing 432. This allows a shorter distance between these bearings thus reducing the overall length of the motor compared to the other embodiments.

Figure 12:
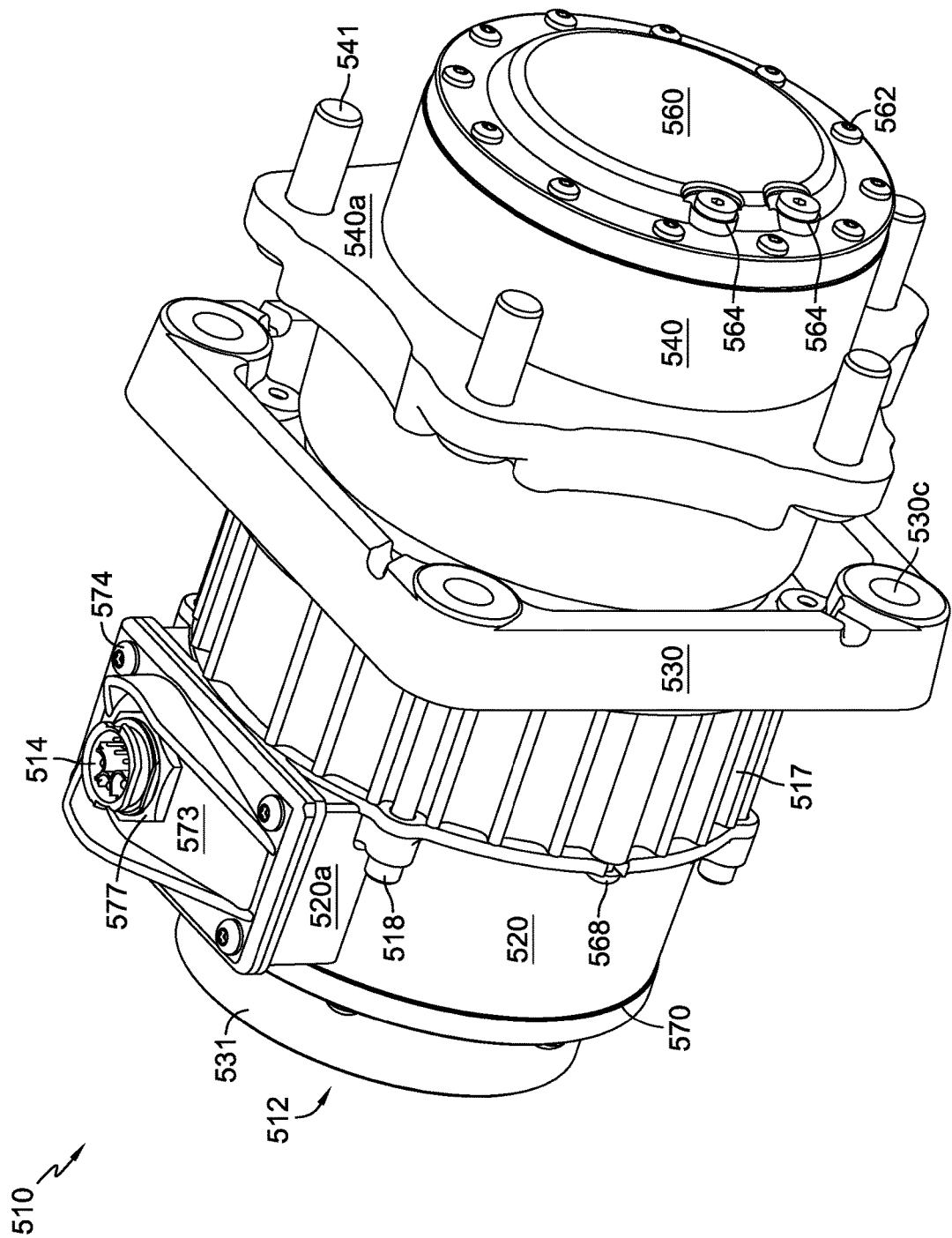
FIG. 12 is a perspective view of an electric motor assembly in accordance with a fifth embodiment of the disclosure herein.
Figure 13:
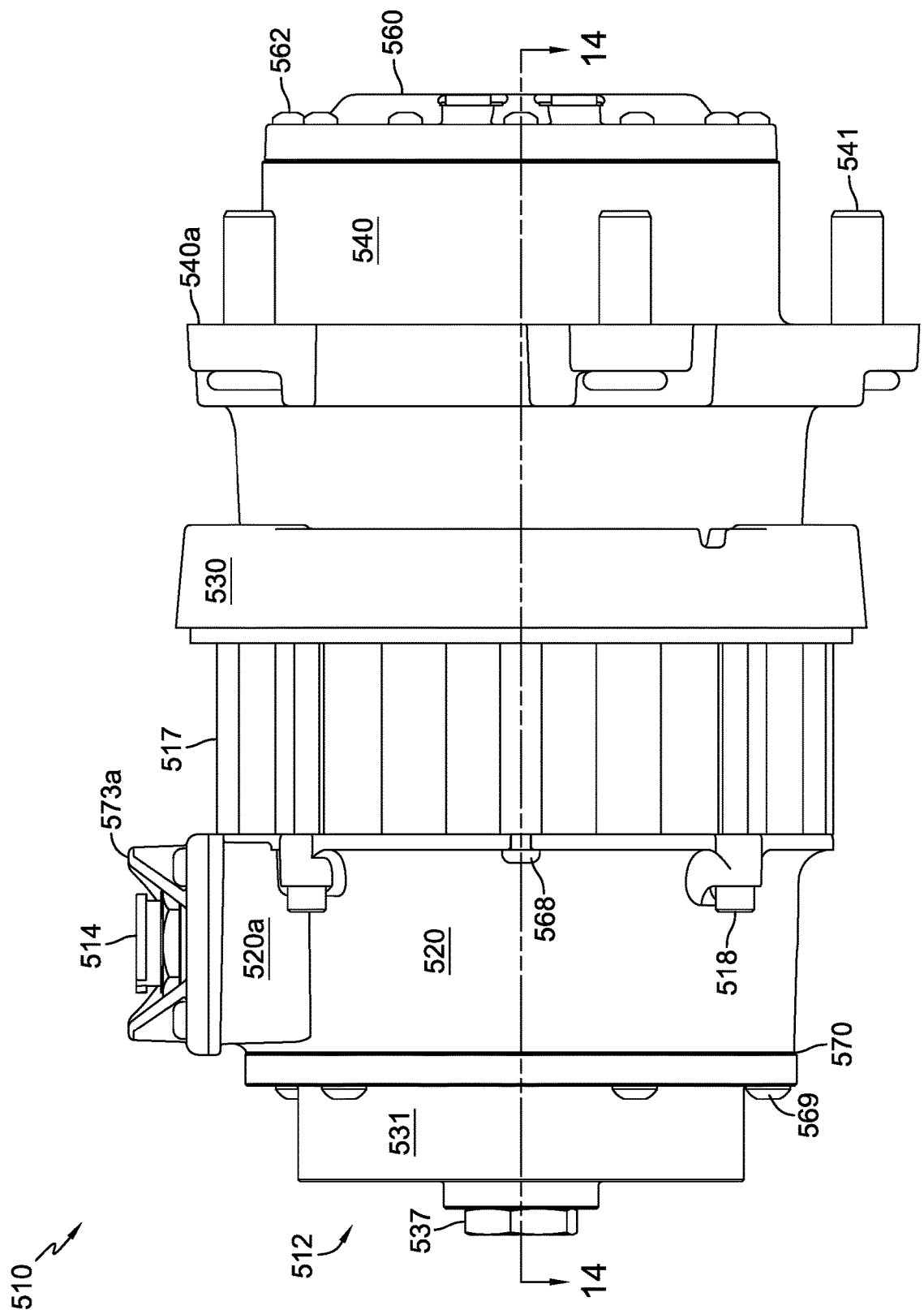
FIG. 13 is an external elevational view of the electric motor assembly of FIG. 12.
Figure 14:
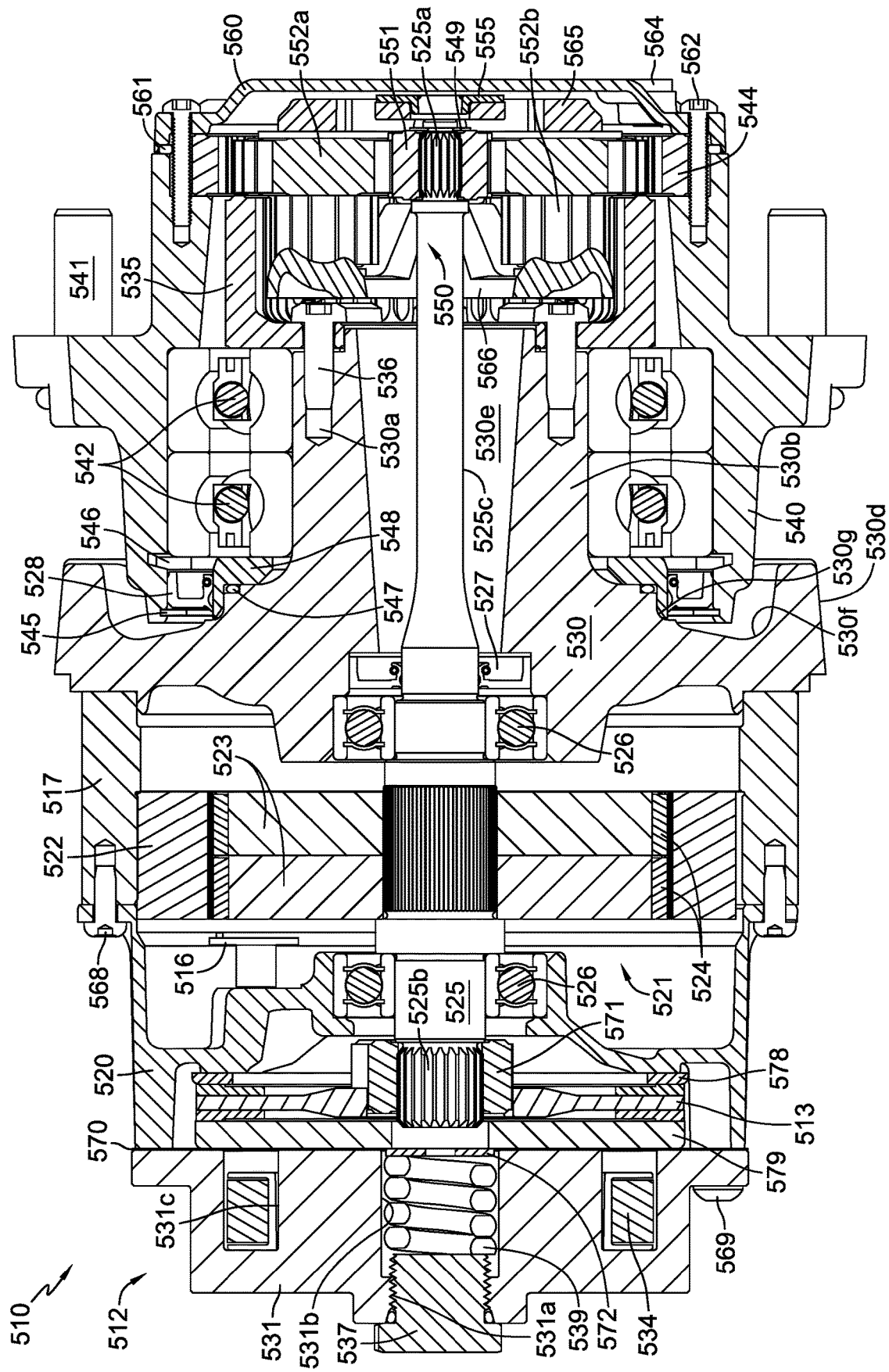
FIG. 14 is a cross-sectional view of the electric motor assembly of FIG. 13, along the line 14-14.

A fifth embodiment of an electric planetary reduction drive 510 is depicted in FIGS. 12-23. As seen in FIGS. 12-14, a housing comprises a main housing 530, a motor stator housing 517, a motor end cap 520, and a brake housing 531. The main housing 530 is joined to a motor end cap 520 (also referred to as a "first housing" or a "second housing component") via fasteners 518. The motor stator housing 517 is interposed between main housing 530 and motor end cap 520. Motor stator housing 517 is preassembled to motor end cap 520 by means of fasteners 568. An electric brake 512, partially housed in brake housing 531 (also referred to as a "brake end cap"), is attached to the opposite end of motor end cap 520 by means of fasteners 569 and sealed by a brake cover gasket 570.

An electrical connector 514 is attached or mounted to an electrical compartment cover 573, which is secured to an electrical compartment 520a integrally formed on motor end cap 520. As illustrated in FIGS. 12 and 21-22, the electrical connector 514 is housed within the electrical compartment and partially extends through a connector mounting opening 573b defined by the electrical compartment cover 573. The electrical connector 514 is coupled to the electrical compartment cover 573 by threadably coupling the electrical connector 514 to a jam nut 577. The electrical connector body 514a includes external threads to threadably couple with the internal threads of jam nut 577. The electrical compartment cover 573 is removably coupled to the electrical compartment 520a via fasteners 574.

Electrical connector 514 comprises motor power phase terminals, brake coil terminals and motor control terminals and is configured for connection to a vehicle control system as may be required. An electric brake coil 534 of electric brake 512 is connected to electrical connector 514 via brake electrical conductors 512b and connector 512a shown in FIGS. 15 and 23. The motor control terminals are electrically connected to a Hall effect board 516 shown in FIGS. 14 and 21. Most of the electrical conductors, such as basic wiring and motor phase windings, are omitted to simplify and improve clarity of the illustrations.

As shown in FIG. 24, electrical connector 514 comprises a connector body 514a, a brake wiring harness with brake connector 514b, and a Hall board wiring harness with Hall board connector 514c. Brake connector 514b engages mating brake connector 512a; Hall board connector 514c engages a mating connector (not shown) of Hall board 516. The brake connector 514b connects to the mating brake connector 512a to electrically connect one or more pins of the connector body 514a to the electric brake coil 534 of the electric brake 512. The Hall board connector 514c connects to a mating connector of the Hall effect board 516 to electrically connect other pin(s) of the connector body 514a to the Hall effect board 516.

Connector pins disposed or housed in connector body 514a of electrical connector 514 are shown in FIG. 25 and a corresponding chart of these pins for an exemplary embodiment is provided in FIG. 26. Pins with designation "1," "2" and "3" in FIGS. 25 and 26 supply power, respectively, to three motor phase windings ("PHASE A," "PHASE B" and "PHASE C") of the electric motor stator 522. Pins labeled "4" and "5" provide, respectively, power ("BRAKE +V") and ground ("BRAKE GND") connections to the electric brake coil 534 via brake connector 514b and respective wiring. Pins labeled "6," "7," "8," "9," "10" and "11" are connected respectively, via Hall board connector 514c and respective wiring, to a temperature sensor ("TEMP"), a first Hall Sensor (HALL "A"), a second Hall sensor ("HALL B"), a Hall board ground terminal ("HALL GND"), a third Hall sensor ("HALL C"), and a Hall board power terminal ("+V"), all of Hall board 516. In other words, Pins #1-3 are designated for conducting power for the electric motor 521, pins #4-5 is designated for a control voltage to control operation of the electric brake 512, and pins #6-12 are designated for electrically connecting to the Hall effect board 516. Additionally, the connector body 514a defines apertures through which the respective pins extend. In the illustrated example, pins #1-3 are detachable from the connector body 514a through the respective ones of the apertures. Alternatively, pins #1-3 may be fixedly connected (e.g. via glue) to the connector body 514a with lead wires permanently attached to electric motor 521. Pins #4-11 are fixedly connected (e.g., via glue) to the connector body 514a. It should be understood that the particular arrangement and association of pins #4-11 may be revised.

Referring to FIGS. 12, 13, 14 and 21-23, the electrical compartment cover 573 includes connector guards 573a adjacent to mounting opening 573b. The connector guards 573a are guard walls that have a height that extends beyond that of the electrical connector 514 to protect electrical connector 514 when it is installed in connector mounting opening 573b. The connector guards 573a are spaced apart from the mounting opening 573b by a distance that provides access to the electrical connector 514 and jam nut 577 to enable a person to attach or detach electrical connector 514 to or from electrical compartment cover 573. An inner gasket 575 engages an inner surface of the electrical compartment cover 573 about the connector mounting opening 573b to seal the joint between electrical connector 514 and electrical compartment cover 573, while an outer gasket 576 is installed in outer seal groove 573c between electrical compartment cover 573 and electrical compartment 520a to seal the joint between electrical compartment cover 573 and electrical compartment 520a. Electrical compartment cover 573 defines outer seal groove 573c in which outer gasket 576 is at least partially positioned. An interface surface 573d defined by perimeter rim 573e of electrical compartment cover 573 contacts a mating surface 520g defined by electrical compartment 520a to limit compression of outer gasket 576. Perimeter rim 573e overlaps a raised seal land 520h of electrical compartment 520a to protect outer gasket 576 while securely and accurately positioning electrical compartment cover 573 on electrical compartment 520a to (1) facilitate installation of fasteners 574 by facilitating alignment between electrical compartment cover 573 and electrical compartment 520a and (2) to protect outer gasket 576 that is positioned between electrical compartment cover 573 and electrical compartment 520a.

Flange 530d of main housing 530 defines a plurality of drive unit mounting holes 530c to attach electric planetary reduction drive 510 to a frame structure such as a vehicle frame. As in prior embodiments depicted herein, output hub 540 also serves as the planetary reduction housing of planetary reduction drive 510, and includes standard wheel mounting fasteners 541 and wheel mounting flange 540a such that it can serve as a wheel hub. Output hub 540 has a first hub end that extends beyond fixed ring gear 535 and a second hub end that extends toward flange 530d of main housing 530. Hub cap or gear cover 560 is attached to the first hub end of the output hub 540, by means of a plurality of fasteners 562, to cover planetary gear assembly 550. Gear cover 560 defines through-holes and the first hub end of output hub 540 defines threaded-holes that receive fasteners 562 to couple gear cover 560 to output hub 540. This joint is sealed by means of dodecagon (12-sided) seal 561. Similar to the second embodiment described herein, gear cover 560 includes a pair of oil fill ports 564 (with plugs).

Figure 15:
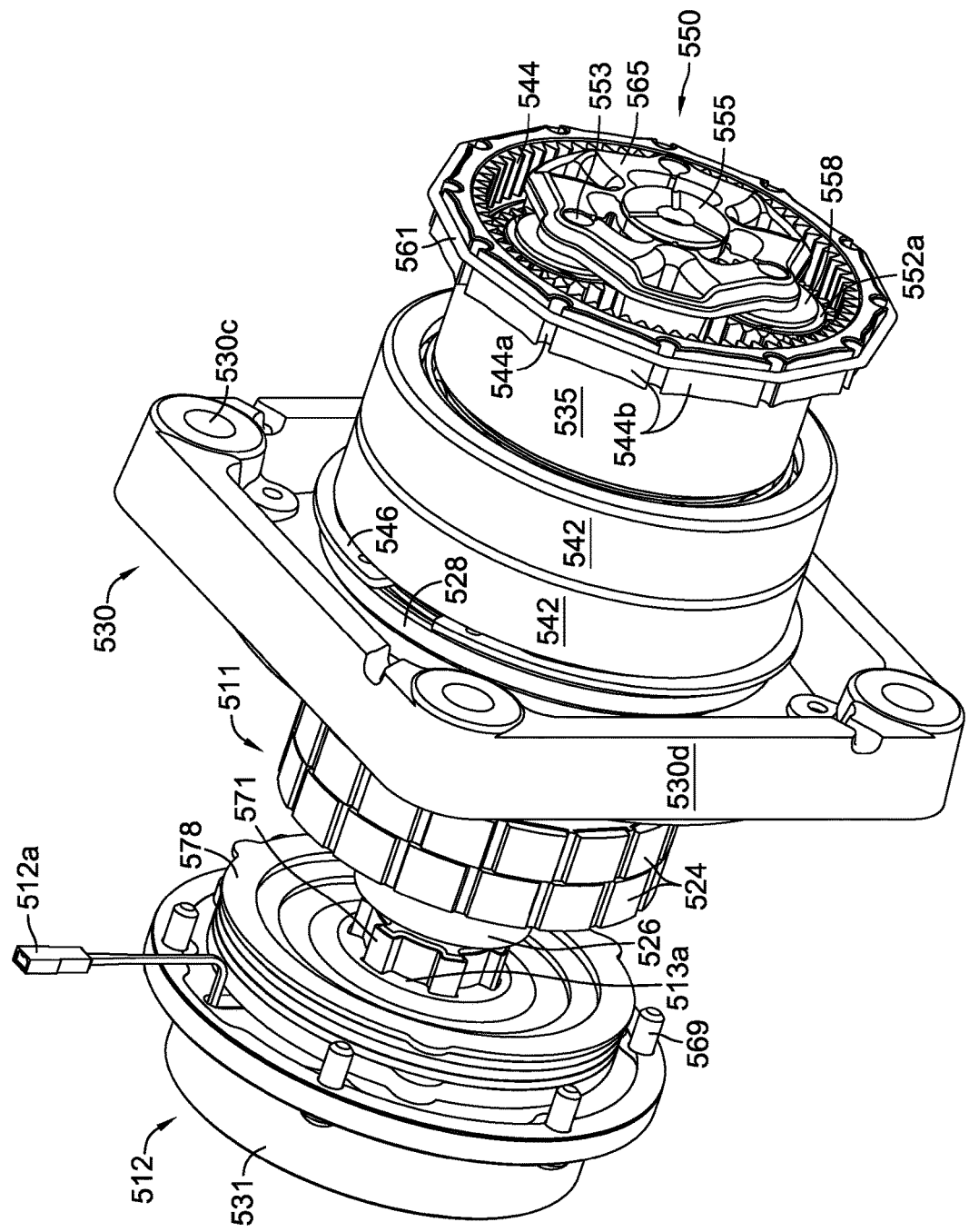
FIG. 15 is a perspective view of the electric motor assembly of FIG. 12, with certain external components removed for clarity.
Figure 16:
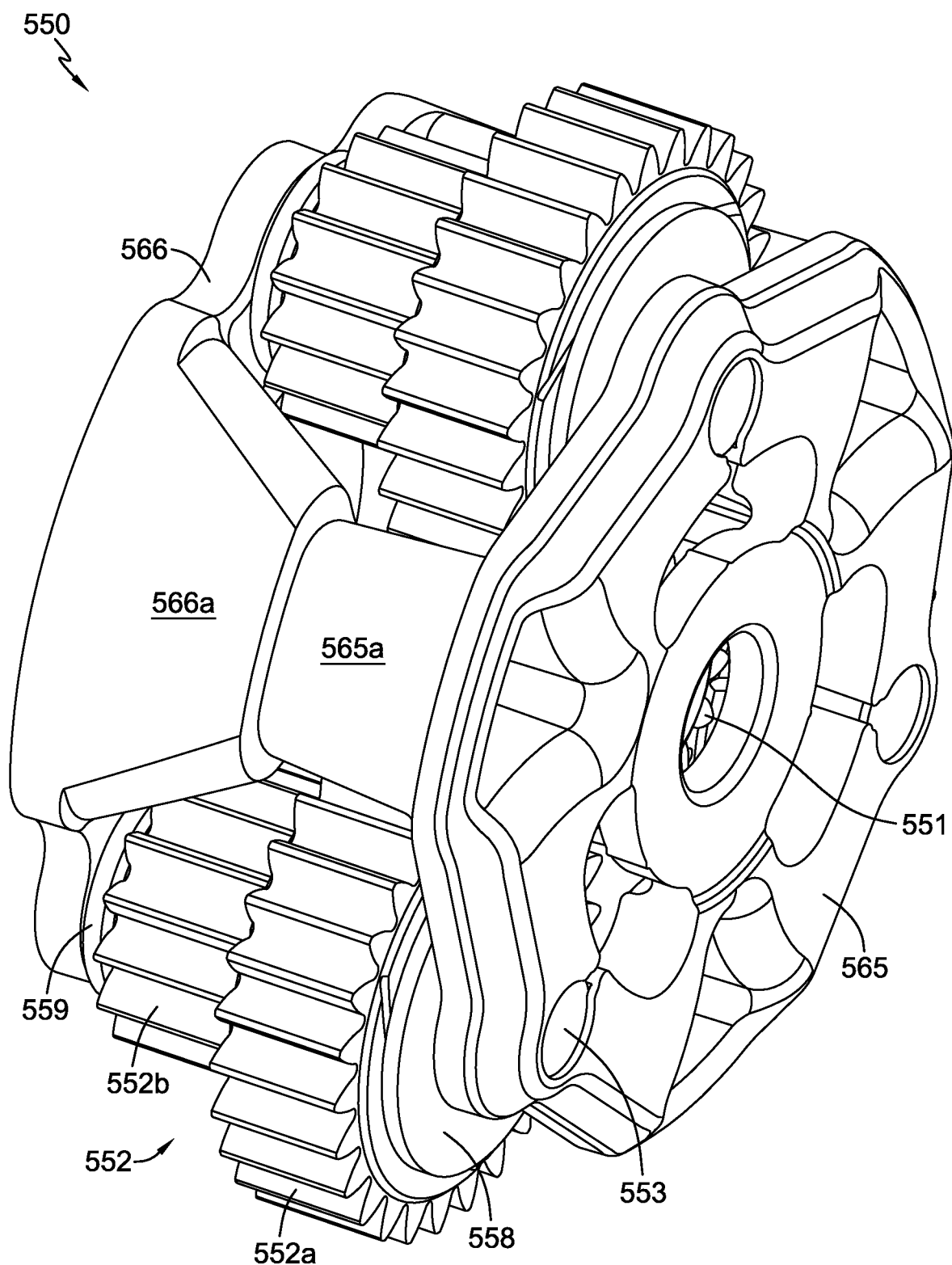
FIG. 16 is a perspective view of a planetary gear assembly of the electric motor assembly of FIG. 12.
Figure 17:
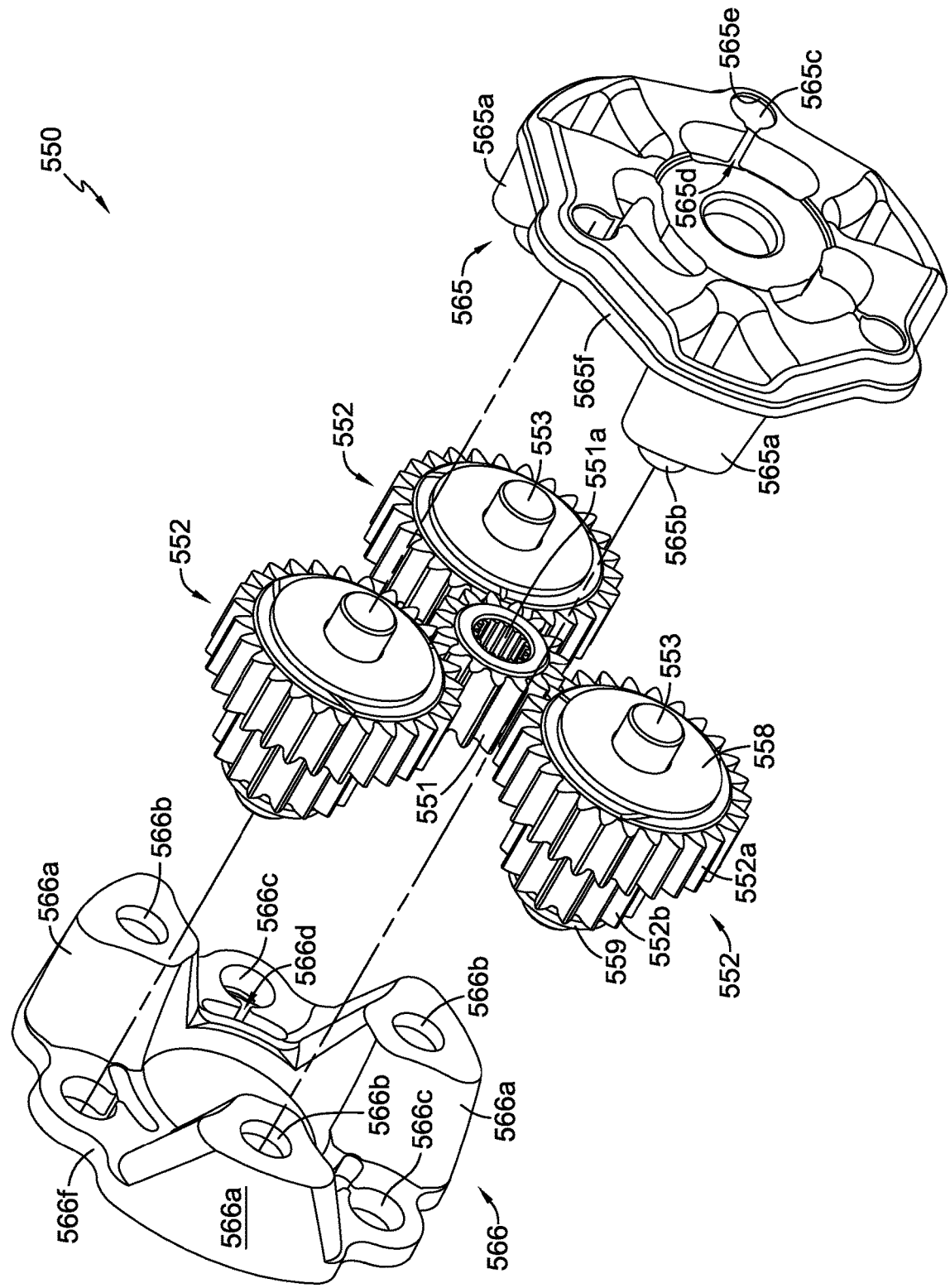
FIG. 17 is an exploded view of the planetary gear assembly of FIG. 16.
Figure 18:
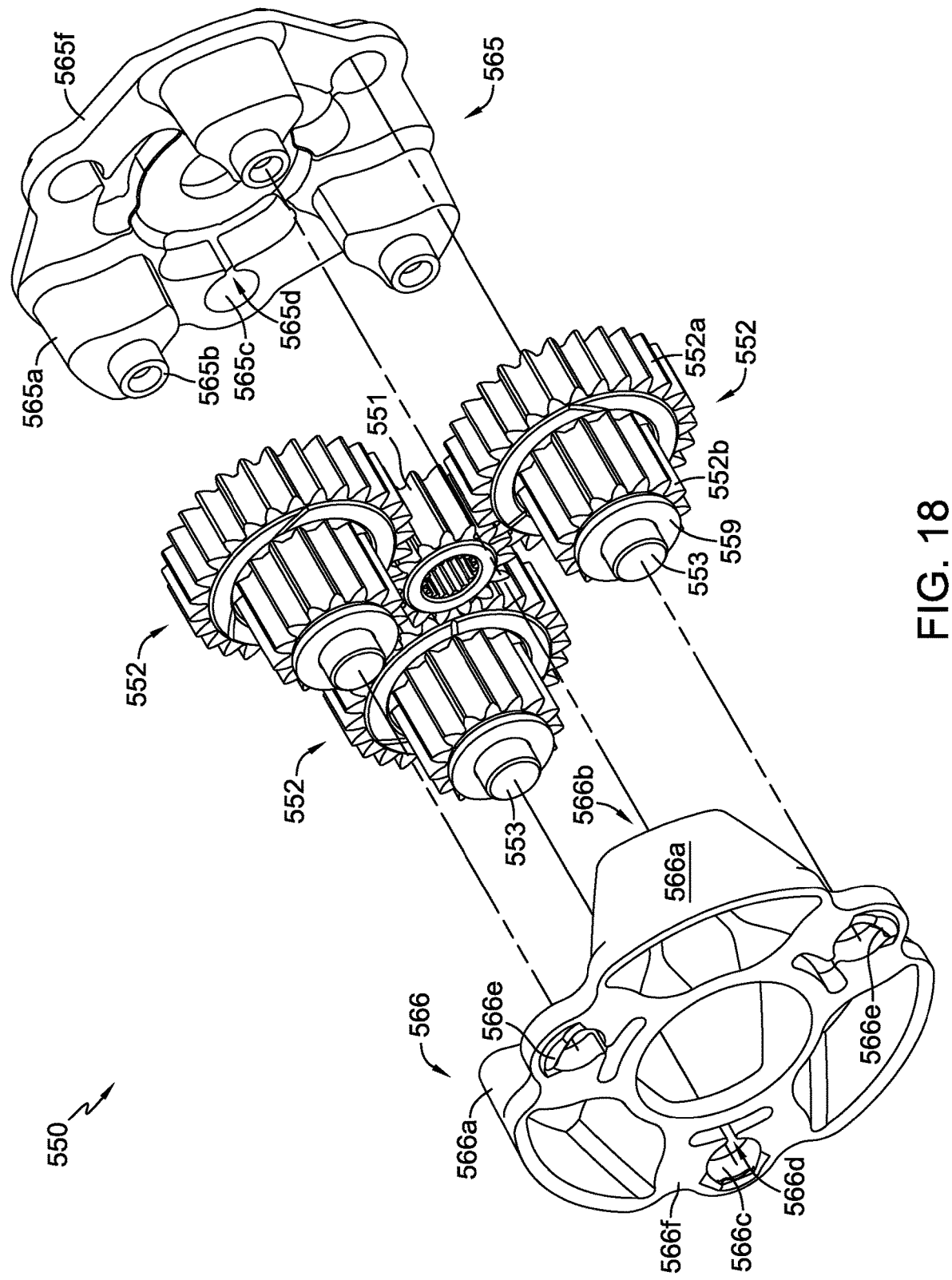
FIG. 18 is an exploded view of the planetary gear assembly of FIG. 16, rotated 90 degrees in relation to the view of FIG. 17.

As shown most clearly in FIGS. 14 and 15, electric motor 521 is disposed in motor stator housing 517 and motor end cap 520. Electric motor 521 includes a stator 522 and a skewed magnet rotor assembly 511. Rotor assembly 511 comprises a pair of rotor components 523 and a set of skewed magnets 524. As shown in FIG. 21, the Hall effect board 516 (with associated spacers or standoffs 516a) is mounted on machined platform(s) 520f formed on motor end cap 520 to precisely position the Hall effect board 516 in close proximity to the rotor magnets 524. An output shaft 525 extends through, is coupled to, and is driven by electric motor 521 and is supported by a pair of bearings 526. A seal 527 is provided adjacent one of the pair of bearings 526, which is disposed in the aperture 530e of spindle 530b between the output shaft 525 and an inner surface of the spindle 530b, to partition and protect the electrical components from the gearing lubricant. Splines 525a are provided on one end of output shaft 525 to engage a sun gear 551 of planetary gear assembly 550 to enable output shaft 525 to drive sun gear 551 and, more generally, planetary gear assembly 550. Splines 525b are provided on the opposite end of output shaft 525 to engage brake hub 571. Output shaft 525, similar to output shaft 225, includes a reduced diameter portion 525c to allow flexing with reduced stress. Knurling 525d is provided on output shaft 525 for press-fit engagement of two identical motor rotor components 523. Each rotor component 523 carries half of the motor magnets 524. One of the pair of rotor components 523 is rotated a precise number of degrees in relation to the other and then this pair of skewed rotor components 523 is press-fit onto output shaft 525 to form the skewed magnet rotor assembly 511. Skewing the magnets in this manner reduces a cogging effect that is particularly noticeable at low speeds, thereby providing a smoother running motor. In one embodiment, the optimum amount of skew between rotor components 523 is 3.75 degrees, but this will vary with electric motor design (e.g. varying with the number of stator slots, rotor poles, etc.).

As shown in FIGS. 15-20, planetary gear assembly 550 includes an outer carrier plate 565 (also referred to as a "first gear carrier") comprising a first plate 565f, three cupped protrusions 565a extending therefrom, and cylindrical projections 565b each of which extends from a respective one of the cupped protrusions 565a. An inner carrier plate 566 (also referred to as a "second gear carrier") comprises a second plate 566f and three mating cupped protrusions 566a extending therefrom. Each of cupped protrusions 566a defines a respective joint opening 566b. During assembly, the cylindrical projections 565b are inserted into the joint openings 566b such that the joint openings 566b receive the cylindrical projections 565b to couple the outer carrier plate 565 to the inner carrier plate 566. A portion of each cylindrical projection 565b that protrudes beyond the joint opening 566b is then upset or swaged to secure the joint connection to secure the outer carrier plate 565 to the inner carrier plate 566 via a swaged connection. The cylindrical projections 565b, the cupped protrusions 565a, and the first plate 565f of the outer carrier plate 565 are integrally formed together and the cupped protrusions 566a and the second plate 566f of the inner carrier plate 566 are integrally formed together to enable the outer carrier plate 565 to couple to the inner carrier plate 566 without separate fasteners via the swaged connection. The cupped protrusions 565a of the outer carrier plate 565 and the cupped protrusions 566a of the inner carrier plate 566 extend around the sun gear 551 and planet gears 552 that are disposed between the outer carrier plate 565 and the inner carrier plate 566 to enable the outer carrier plate 565 and the inner carrier plate 566 to couple together via the swaged connection.

A carrier pin 553 extends axially from each of the planet gears 552. The carrier pins 553 supporting the respective planet gears 552 are supported by and trapped between outer carrier plate 565 and inner carrier plate 566 during this joining process. Specifically, the ends of each carrier pin (or jack shaft) 553 are press-fit into support openings 565c, 566c and retained by carrier pin retention features 565e, 566e to retain the planet gears 552 between the outer and inner carrier plates 565, 566. The carrier pins 553 and the support openings 565c, 566c are sized to enable the support openings 565c, 566c to receive the carrier pins 553 via press-fit. The support openings 565c are defined by the first plate 565f of the outer carrier plate 565, and the support openings 566c are defined by the second plate 566f of the inner carrier plate 566.

Relief slits 565d, 566d are formed in the walls of the support openings 565c, 566c to prevent cracks from occurring during the press-fit operation of the support openings 565c, 566c. The first plate 565f of the outer carrier plate 565 defines the relief slits 565d. Each of the relief slits 565d is connected to a respective one of the support openings 565c to deter cracks from forming in the outer carrier plate 565 when a respective one of the carrier pins 553 is received by the respective support opening 565c via press-fit. Similarly, each of the relief slits 566d is connected to a respective one of the support openings 566c to deter cracks from forming in the inner carrier plate 566 when a respective one of the carrier pins 553 is received by the respective support opening 566c via press-fit.

Sun gear 551 is mounted on an end of output shaft 525 by means of splines 525a and retained by retaining ring 549. Sun gear 551 defines a first axial opening having internal splines 551a that receive external splines 525a of output shaft 525 to couple sun gear 551 to output shaft 525. In the illustrated example, inner carrier plate 566 defines a second axial opening that enables output shaft 525 to extend through inner carrier plate 566 and to sun gear 551 that is disposed between inner carrier plate 566 and outer carrier plate 565. Retaining ring 549 assists in locating sun gear 551 and prevents contact with gear cover 560. Flanged washer 555 is also provided between the outer carrier plate 565 and gear cover 560. The planet gears 552 are disposed around and engage or are meshed with the sun gear 551. Sun gear 551 drives the plurality of planet gears 552, each of which comprises a first stage gear form 552a and a second stage gear form 552b adjacent first stage gear form 552a. The second stage gear form 552b has a smaller outer diameter than that of the first stage gear form 552a. The second stage gear form 552b may be slip fit or press fit into the first stage gear form 552a.

As seen in FIG. 14, planetary gear assembly 550 is disposed entirely within output hub 540 and includes a first stage ring gear 544 and a fixed second stage ring gear 535. As in the second embodiment, the first stage ring gear 544 comprises projections 544b that fit into corresponding slots in the output hub 540 to provide an anti-rotation feature. As also illustrated in the second embodiment, the large ring gear 544 is clamped between gear cover 560 and output hub 540 by means of fasteners 562 extending through the fastener recesses 544a formed on ring gear 544.

In a further similarity with the second embodiment, main housing 530 includes spindle 530b and flange 530d that extends radially outwardly from the spindle 530b. The spindle 530b has first and second opposing ends and defines an aperture 530e extending axially between the first and second ends. The output shaft 525 extends through the aperture 530e of the spindle 530b. Flange 530d extends radially outward from the second end of the spindle 530b. Fillet corners 530f and 530g are formed on surfaces of main housing 530 as shown. The spindle 530b defines threaded bores 530a at the first end for connecting fixed ring gear 535 thereto by means of fasteners 536. The first end of the spindle defines the threaded bores 530a and the fixed ring gear 535 defines mounting holes that align with the threaded bores 530a to receive the fasteners 536. It should be noted that the planetary gear assemblies 250, 550 are basically interchangeable with only minor modifications.

Figure 20:
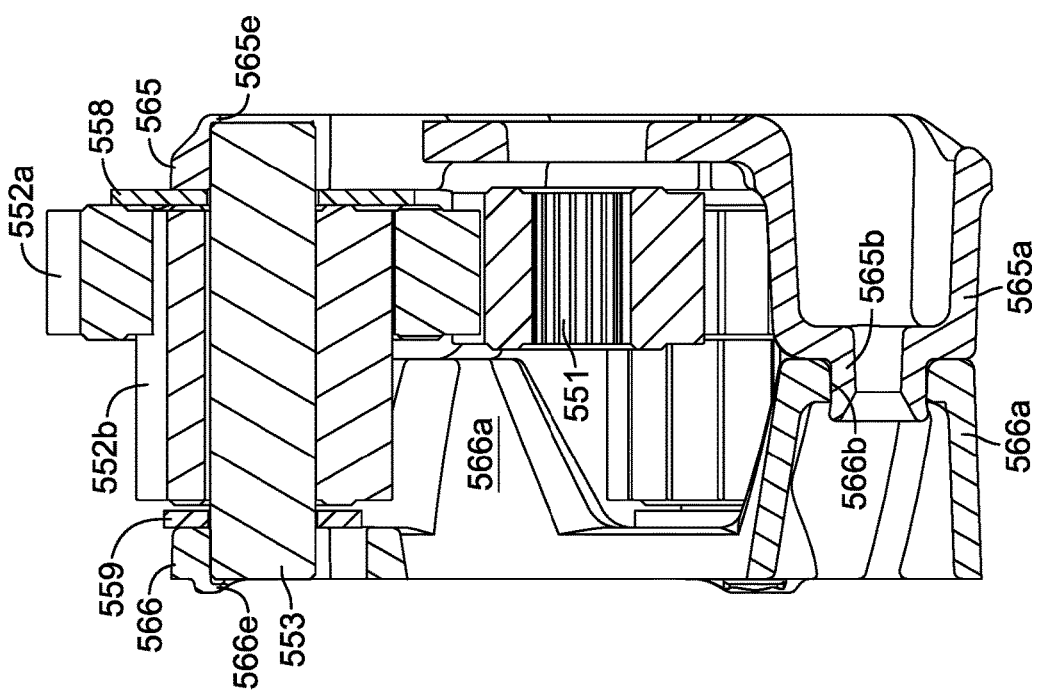
FIG. 20 is a cross-sectional view of the planetary gear assembly of FIG. 16, along the line 20-20.
Figure 19:
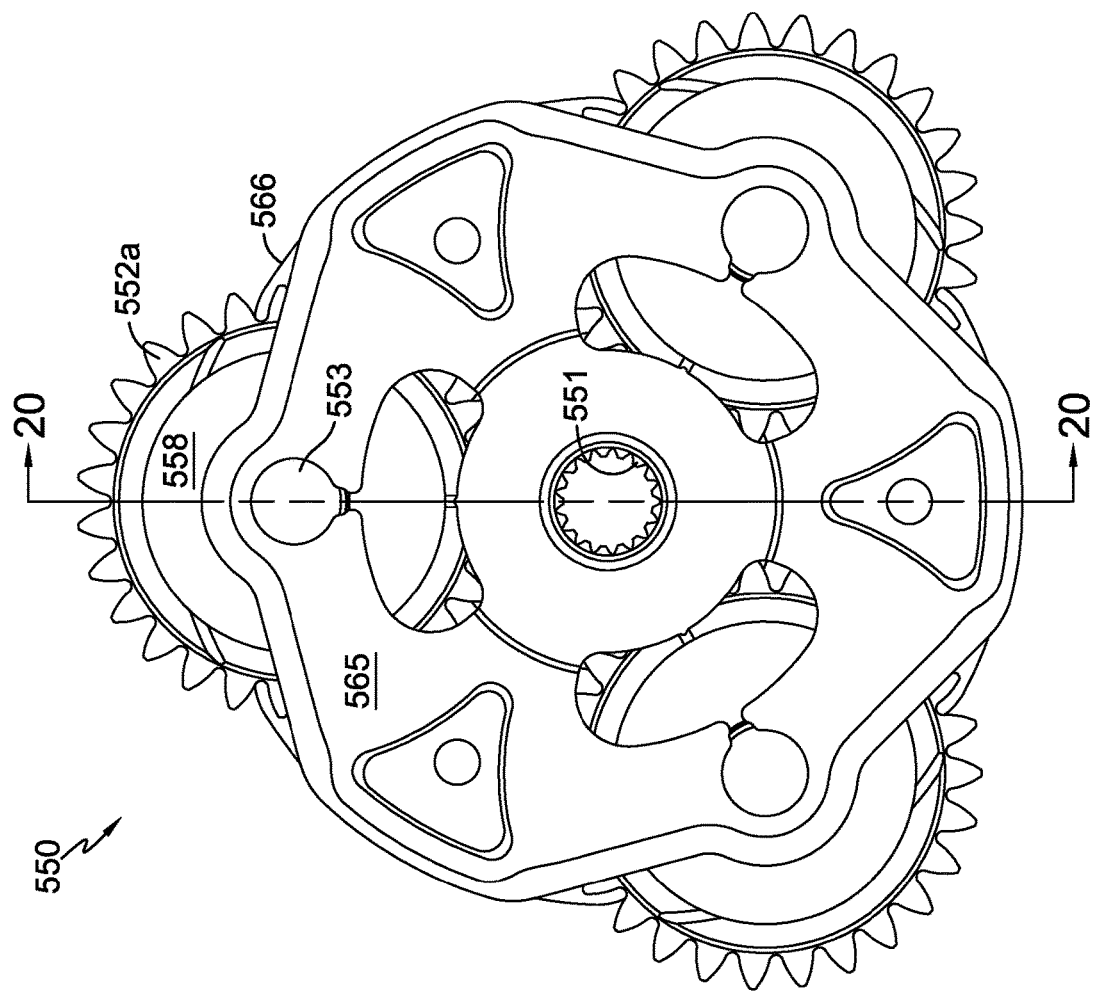
FIG. 19 is an external elevational view of the planetary gear assembly of FIG. 16.

Second stage gear forms 552b of the planet gears 552 are meshed with, engage, and rotate against fixed ring gear 535. The fixed ring gear 535 is coupled to the first end of the spindle 530b via the fasteners 536 and is housed in the output hub 540. The fixed ring gear 535 also houses the second stage gear forms 552b such that the planet gears 552 are at least partially disposed in the output hub 540. First stage gear forms 552a of the planet gears 552 engage and drive the rotating first stage ring gear 544 that is attached to the output hub 540. The first stage gear forms 552a of the planet gears 552 are meshed with the first stage ring gear 544 to cause the output hub 540 to rotate about the spindle 530b. Referring to FIG. 20, thrust washers 558 are disposed between the outer carrier plate 565 and first stage gears 552a, while thrust washers 559 are disposed between inner carrier plate 566 and the second stage gears 552b. Planetary gear assembly 550 will rotate in the same direction as output shaft 525, whereas planet gears 552 will rotate in the opposite direction, such that planetary gear assembly 550 acts as both a speed reducer and torque amplifier for output hub 540.

A stacked pair of hub bearings 542 is disposed on spindle 530b of main housing 530 to bear loads transmitted through output hub 540 and support rotation of output hub 540. The stacked pair of hub bearings 542 contact each other. The stacked pair of hub bearings 542 are positioned radially between an outer surface of the spindle 530b and an inner surface of the output hub 540 and axially between the fixed ring gear 535 and flange 530d of main housing 530 to facilitate rotation of the output hub 540 about the spindle 530b. An outer surface of each of the hub bearings 542 contacts the inner surface of the output hub 540, and an inner surface of each of the hub bearings 542 contacts the outer surface of the spindle 530b. The inner races of the stacked pair of hub bearings 542 are clamped in place on spindle 530b between ring gear 535 and spacer ring 548 when fasteners 536 are installed in threaded bores 530a.

A first of the hub bearings 542 contacts spacer ring 548, and a second of the hub bearings 542 contacts fixed ring gear 535. Spacer ring 548 is positioned between and engages the first of the hub bearings 542 and main housing 530 adjacent both of the fillet corners 530f and 530g that assist in alleviating stresses on main housing 530. Spacer ring 548 includes a body and a rim portion extending transversely therefrom. Output hub 540 is firmly secured against the outer race of the pair of bearings 542 by retaining ring 546. Hub seal 528 and spindle seal 547 (e.g., an O-ring seal) engage the spacer ring 548 to create the fluid seals. The spacer ring 548 comprises a compression face for the static spindle seal 547 and a running surface for the dynamic hub seal 528. Spindle seal 547 is positioned between flange 530d of main housing 530, the base of spacer ring 548, and the arm of spacer ring 548. The hub seal 528 is positioned radially between and engages the spacer ring 548 and the inner surface of the output hub 540.

Retaining rings 545, 546 are arranged adjacent hub seal 528. Hub seal 528 is positioned axially between the retaining rings 545, 546. The retaining ring 545 is positioned adjacent to a first side of the hub seal 528, and the retaining ring 546 is positioned adjacent to a second side of the hub seal 528. The retaining ring 545 extends radially between the arm of the spacer ring 548 and the inner surface of the output hub 540. The retaining ring 546 is positioned between hub seal 528 and a first of the hub bearings 542. Additionally, a portion of the retaining ring 546 is positioned in a retaining ring groove defined along the inner surface of the output hub 540. To facilitate positioning of the retaining ring 546, the retaining ring groove is partially defined by a chamfered surface that receives and engages a chamfered surface of the retaining ring 546.

Figure 23:
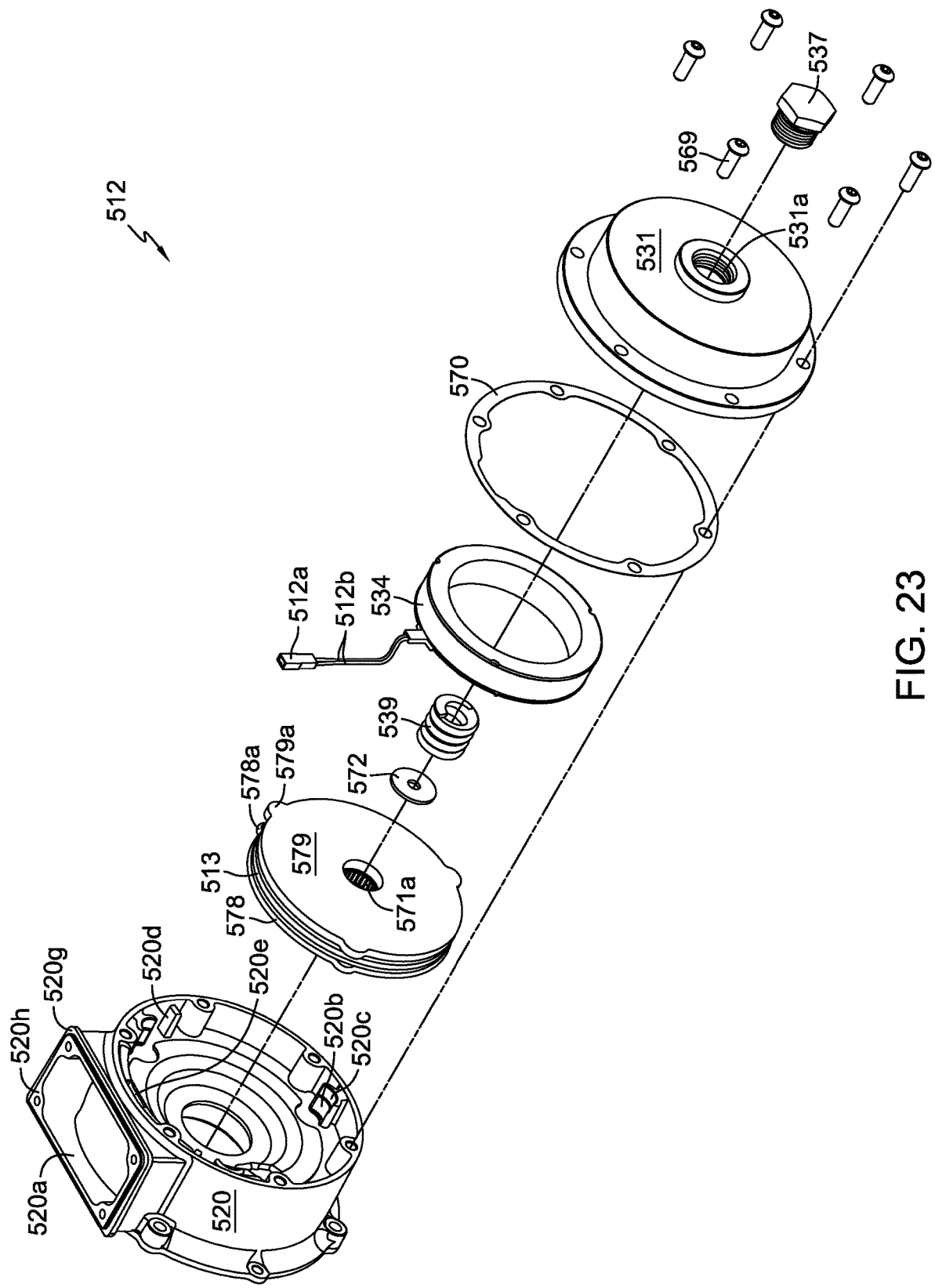
FIG. 23 is an exploded view of the brake assembly of FIG. 12.

Similar to brake assembly 212 and seen most clearly in FIGS. 14, 15 and 23, electric brake assembly 512 is primarily disposed inside a brake housing compartment defined by motor end cap 520 and brake housing 531, which is secured to motor end cap 520 by fasteners 569. Brake assembly 512 comprises a brake rotor 513 disposed in the brake housing compartment. The brake rotor 513 has a castellated inner diameter 513a that is slidingly engaged to a castellated brake rotor hub 571. The castellated brake rotor hub 571 also comprises splines 571a that are slidingly engaged to splines 525b of output shaft 525. The axial length of brake rotor hub 571 and splines 571a is significantly greater than the thickness of brake rotor 513. The greater axial length of brake rotor hub 571 ensures a robust interface between splines 571a and splines 525b to withstand dynamic loading of this spline interface when the electric brake 512 is engaged. Brake rotor 513 is positioned between and adjacent to an inner stator 578 and an outer stator 579 within the brake housing compartment. Stators 578 and 579 are configured to provide a braking force to the brake rotor 513 under the influence of compression spring 539. Stators 578 and 579 comprise a plurality of anti-rotation tabs 578a and a plurality of anti-rotation tabs 579a, respectively. Referring to FIG. 23, the plurality of anti-rotation tabs 578a is slidingly engaged to inner mating grooves 520b, which are defined by motor end cap 520 adjacent the brake housing compartment, to prevent rotation of stator 578 within the brake housing compartment. The plurality of anti-rotation tabs 579a is slidingly engaged to outer mating grooves 520c, which are defined by motor end cap 520 adjacent the brake housing compartment, to prevent rotation of stator 579 within the brake housing compartment. The overall diameter (including anti-rotation tabs) of the inner stator 578 is less than the overall diameter (including anti-rotation tabs) of the outer stator 579. That is, the anti-rotation tabs 578a, 579a are stepped such that the tab 579a extends radially beyond the tab 578a. Additionally, the respective grooves 520b, 520c are adjacent to one another and stepped in relation to one another such that the groove 520c is larger than the groove 520b. The stepped configuration of the anti-rotation tabs 578a, 579a and the stepped grooves 520b, 520c requires inner stator 578 to be inserted into the brake housing compartment before outer stator 579, thereby preventing an incorrect stator assembly sequence. Ribs 520d are also defined by motor end cap 520 to further facilitate positioning of the stators 578, 579 within the motor housing compartment by ensuring that the anti-rotation tabs 578a, 579a are aligned with grooves 520b, 520c during assembly.

Electric brake coil 534 is positioned adjacent to outer stator 579. In FIG. 14, the electric brake coil 534 is disposed within a circumferential slot 531c defined by the brake housing 531. When electric brake coil 534 is energized via conductors 512b (routed through opening 520e formed in motor end cap 520), electric brake coil 534 removes the braking force from stators 578 and 579 by electro-magnetically pulling the outer stator 579 away from the brake rotor 513 and against the brake housing 531. That is, the electric brake coil 534, when energized, applies an electro-magnetic force that is greater than the spring biasing force to the outer stator 579 to release outer stator 579 from the brake rotor 513. When electric brake coil 534 is de-energized, compression spring 539 applies a biasing force against thrust washer 572, which bears against stator 579 to the stator/rotor stack comprising stator 579, rotor 513 and stator 578 against motor end cap 520. Inner stator 578 is formed of high-carbon steel to limit an amount of wear caused by the brake rotor 513 and/or to prevent the electro-magnetic force of the electric brake coil 534 from moving the inner stator 578. Outer stator 579 is positioned between electric brake coil 534 and brake rotor 513 to facilitate the electro-magnetic force in moving outer stator 579. Additionally, outer stator 579 is formed of low-carbon steel and/or is thicker than inner stator 578 to further facilitate the electro-magnetic force in moving outer stator 579.

Figure 27:
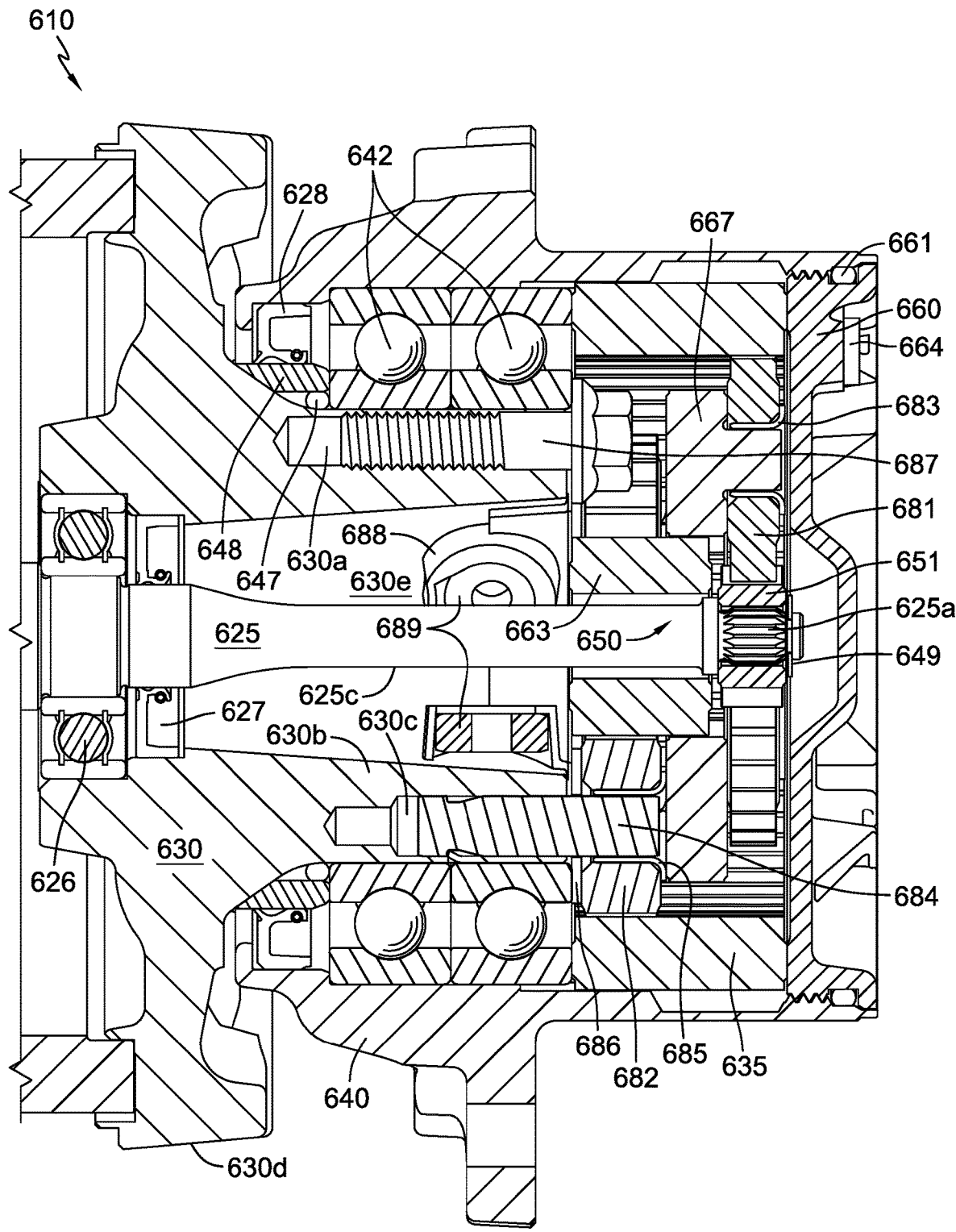
FIG. 27 is a cross-sectional view of a portion of an electric motor assembly in accordance with a sixth embodiment of the disclosure herein.

Thrust washer 572 is positioned between and engages compression spring 539 and outer stator 579 to facilitate application of the spring biasing force to outer stator 579. Threaded aperture 531a formed by brake housing 531 and spring chamber 531b form a cylindrical volume. Compression spring 539 is disposed in spring chamber 531b adjacent threaded aperture 531a formed by brake housing 531. The diameters of compression spring 539 and spring chamber 531b are larger than the diameter of threaded aperture 531a, to prevent loss of compression spring 539 through threaded aperture 531a. An external brake release plug 537 is movably disposed in threaded aperture 531a formed by brake housing 531. Compression spring 539 is configured to engage and be compressed by brake release plug 537 to cause compression spring 539 to apply a spring biasing force against thrust washer 572 which bears against stator 579 to compress the stator/rotor stack comprising stator 579, rotor 513 and stator 578 against motor end cap 520. Brake release plug 537 is threadably coupled to brake housing 531 via threading. Brake release plug 537 can be loosened to position brake release plug 537 at a location relative to brake housing 531 that reduces the biasing force. For example, the brake release plug 537 can be loosened via unthreading until compression spring 539 disengages thrust washer 572 and/or outer stator 579 to enable a vehicle to be moved in a manual bypass mode when, for example, electrical power is unavailable. A cross-sectional view of a sixth embodiment depicting an electric planetary reduction drive 610 is shown in FIG. 27. The electric motor and brake assembly portion of drive 610 is cut away in FIG. 27, but may be the same as the previously described electric motor and brake assembly portion of electric planetary reduction drive 510 shown in FIG. 14.

As seen in FIG. 27, a two-stage reduction gear arrangement 650 is housed or disposed entirely within output hub 640 and includes a single ring gear 635 that is fixed to and within output hub 640 and therefore rotates with output hub 640 about spindle 630b. A motor output shaft 625 is supported by a pair of bearings 626 (one shown). A seal 627 is provided adjacent to one of the pair of bearings 626 to partition and protect the electrical components from the gearing lubricant. The motor output shaft 625 includes a reduced diameter portion 625c to allow flexing with reduced stress and splines 625a are provided on one end of motor output shaft 625 to engage a first stage sun gear 651 of planetary gear arrangement 650. The first stage sun gear 651 is mounted on motor output shaft 625 by means of splines 625a and retained by retaining ring 649. That is, first stage sun gear 651 is coupled to and driven by output shaft 625.

The two-stage reduction gear arrangement 650 comprises a planetary first stage gear set and a stationary second stage gear set, as will be described below. It should be noted that ring gear 635 may optionally comprise two separate ring gears, one for each of these two gear sets, with both of these two separate ring gears fixed within output hub 640. Using two separate ring gears rather than a single ring gear 635 may reduce manufacturing costs.

A plurality of first stage planetary gears 681 (the planetary first stage gear set) is driven by the first stage sun gear 651. The first stage planetary gears 681 are supported on support pins of a planetary gear carrier 667 with flanged bushings 683 interposed to reduce rotational wear and provide axial force bearing surfaces. The first stage planetary gears 681 are meshed with first stage sun gear 651 and ring gear 635. Planetary gear carrier 667 is drivingly engaged to a second stage sun gear 663, which in turn drives a plurality of second stage reduction gears 682 (the stationary second stage gear set) that are rotationally mounted on stationary carrier pins 684. The second stage reduction gears 682 are meshed with the second stage sun gear 663 and ring gear 635. The stationary carrier pins 684 are supported in bores 630c formed in spindle 630b of main housing 630 and may be staked in place, as shown, to ensure retention in spindle 630b.

Main housing 630 includes spindle 630b and a flange 630d that extends radially outwardly from spindle 630b. Spindle 630b has first and second opposing ends and defines an aperture 630e extending axially between the first and second ends. Output shaft 625, which is coupled to and driven by a motor, extends through the aperture 630e of spindle 630b. The flange 630d extends radially outward from the second end of spindle 630b. The bores 630c from which stationary carrier pins 684 extend are defined at the first end of spindle 630b.

A magnet carrier 688 may be mounted in the aperture 630e of spindle 630b at the first end. A plurality of magnets 689 can be retained by the magnet carrier 688 to capture any metal filings generated by the two-stage reduction gear assembly 650 to extend its service life. As illustrated, the magnet carrier 688 is a tri-lobbed carrier that retains three magnets 689, but various numbers of magnets are contemplated within the scope of the invention. Magnet carrier 688 includes a flange that extends beyond and engages the first end of the spindle 630b. Magnet carrier 688 is held in place by thrust washers 686 that are positioned between and engage second stage reduction gears 682 and the lip of magnet carrier 688.

Flanged bushings 685 are interposed between the carrier pins 684 and the second stage reduction gears 682. Thrust washers 686 are positioned between the second stage reduction gears 682 and the inner bearing race of the second bearing of the pair of hub bearings 642. The first stage planetary gears 681 and the second stage reduction gears 682 cooperatively drive ring gear 635 and hub 640.

Stacked pair of hub bearings 642 is disposed on spindle 630b to bear loads transmitted through output hub 640 and to support rotation of output hub 640. Stacked pair of hub bearings 642 is positioned radially between an outer surface of spindle 630b and an inner surface of output hub 640. Stacked pair of hub bearings 642 includes a first bearing and a second bearing that are arranged axially with respect to each other in a side-by-side manner. The inner races of the stacked pair of hub bearings 642 are clamped in place on spindle 630b by a plurality of fasteners 687 (one shown) installed in threaded bores 630a defined at the first end of spindle 630b, thereby retaining hub bearings 642 on spindle 630b. Fasteners 687 bear against the inner race of the second bearing of the pair of hub bearings 642, which in turn bear against a spacer ring 648 that bears against main housing 630. Spacer ring 648 is positioned adjacent to the second end of spindle 630b and between the first bearing of the pair of hub bearings 642 and flange 630d of main housing 630. That is, the pair of hub bearings 642 is positioned axially between and engages spacer ring 648 and a combination of fasteners 687 and ring gear 635.

Spacer ring 648 extends to a curved outer surface of main housing 630. Hub seal 628 and spindle seal 647 (e.g., an O-ring seal) engage spacer ring 648 to create the fluid seals.

Spacer ring 648 comprises a compression face for the static O-ring seal 647 and a running surface for the dynamic hub seal 628. The spindle seal 647 is positioned between and engages the spindle 630b, the spacer ring 648, and the first bearing of the pair of hub bearings 642. The hub seal 628 includes a lip and is positioned radially between and engages the spacer ring 648 and the inner surface of the output hub 640.

A hub cap or gear cover 660 is threaded on its periphery to engage mating threads formed on output hub 640. When gear cover 660 is threadably coupled to output hub 640, gear cover 660 covers planetary gear arrangement 650 and bears against ring gear 635. In turn, ring gear 635 bears against the outer race of one of the stacked pair of hub bearings 642, thereby forcing the stacked pair of hub bearings 642 to bear against output hub 640 in order to prevent and/or otherwise deter, in cooperation with fasteners 687, axial movement of output hub 640 relative to spindle 630b. Gear cover 660 also serves as a running surface for the flanged bushings 683 that support and protect the planetary first stage gears 681.

Gear cover 660 is sealed to hub 640 by means of a peripheral O-ring seal 661. Similar to other gear covers described herein, gear cover 660 includes a pair of oil fill ports 664 (one shown).

Figure 28:
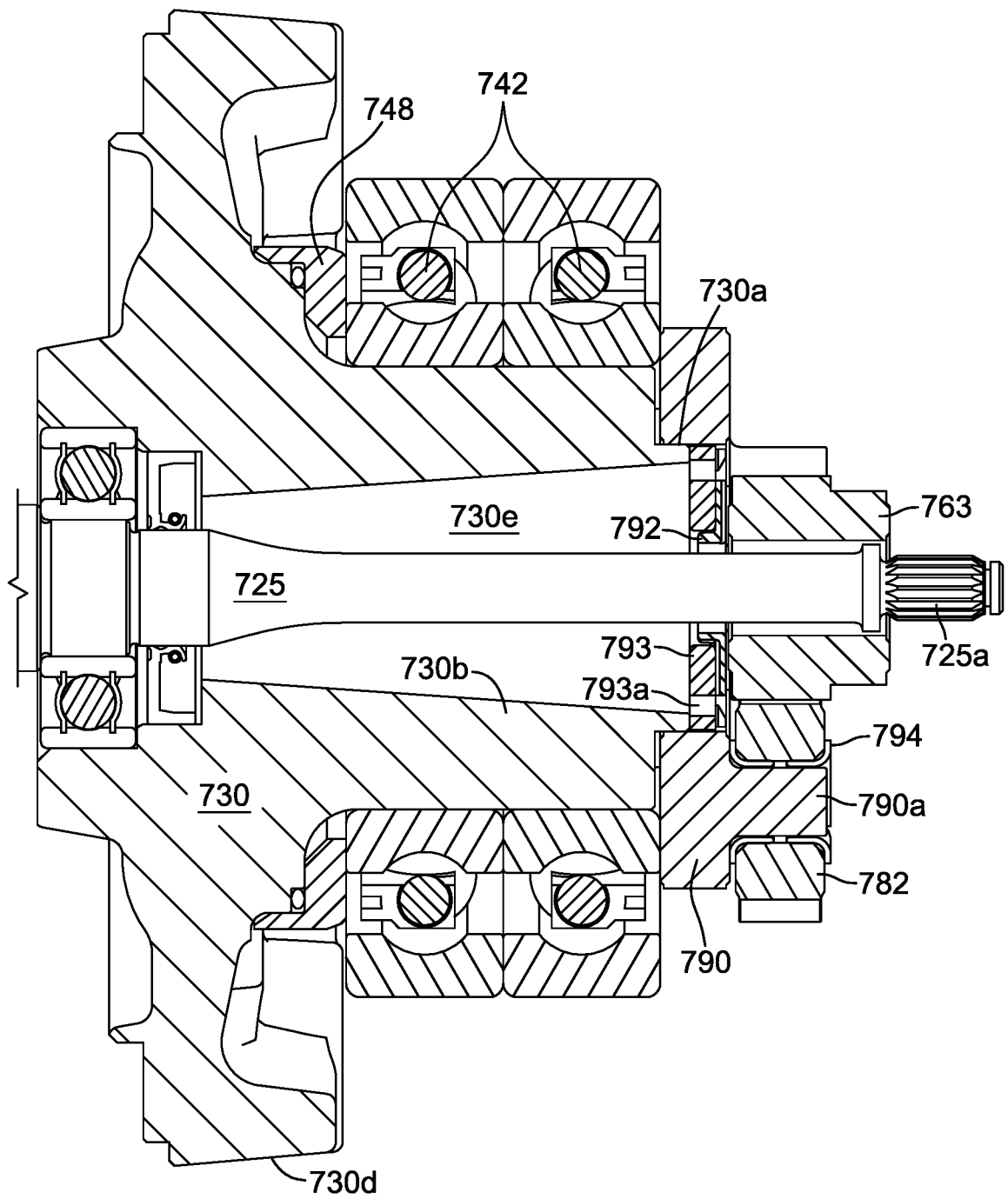
FIG. 28 is a cross-sectional view of an optional configuration for mounting a stationary gear set similar to the stationary gear set shown in FIG. 27.
Figure 29:
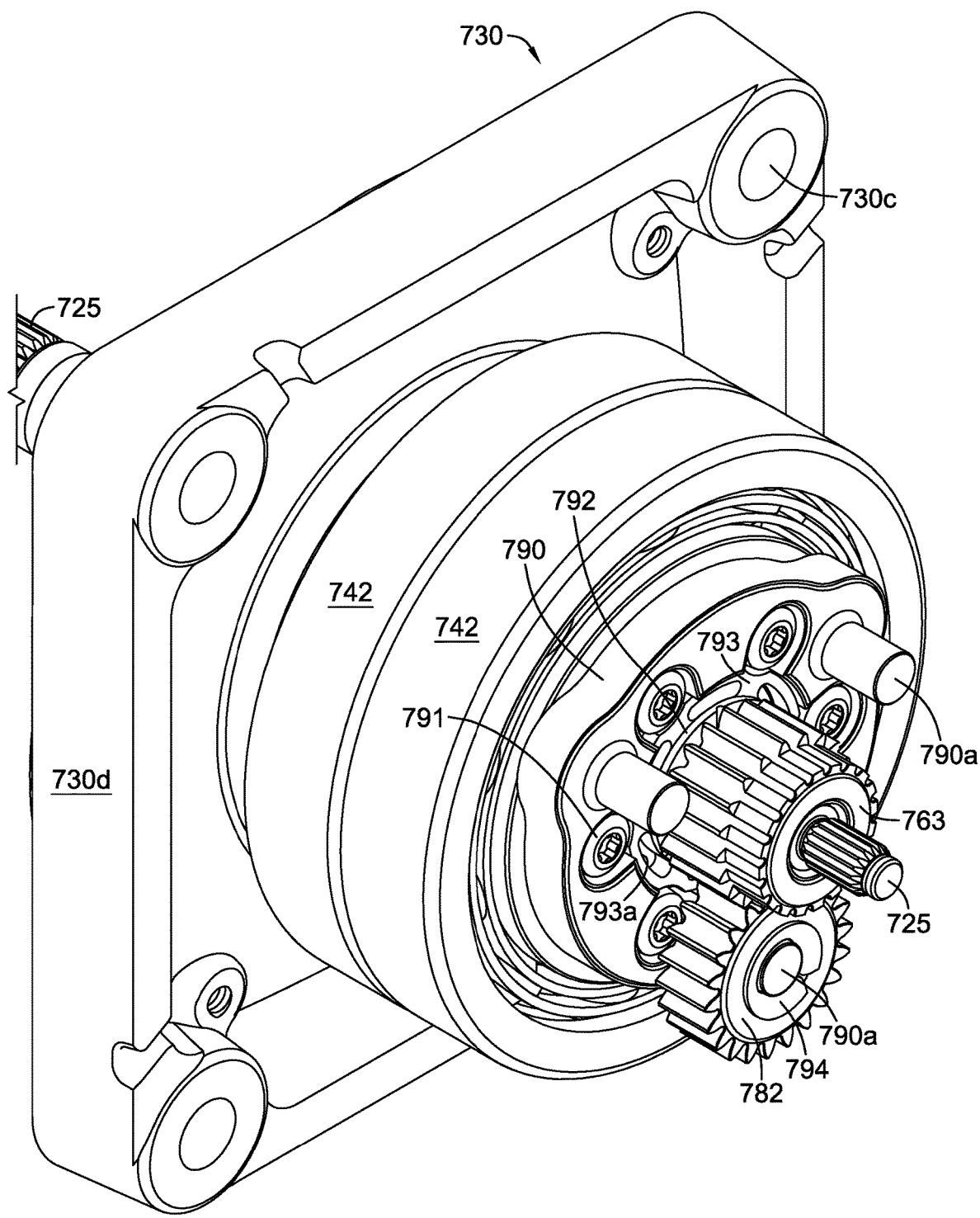
FIG. 29 is a perspective view of the optional configuration for mounting the stationary gear set shown in FIG. 28.

FIGS. 28 and 29 depict an optional configuration for mounting a stationary gear set similar in form and function to the stationary second stage reduction gears 682 shown in FIG. 27. In this optional configuration, a pilot 730a is formed on the distal end (also referred to as the "first end") of spindle 730b of main housing 730 to locate a stationary carrier 790 that is attached to the spindle 730b by means of a plurality of fasteners 791. Main housing 730 includes spindle 730b and a flange 730d that extends radially outwardly from spindle 730b. Spindle 730b has first and second opposing ends and defines an aperture 730e extending axially between the first and second ends. Output shaft 725, which is coupled to and driven by an electric motor (not shown), extends through the aperture 730e of spindle 730b. The flange 730d extends radially outward from the second end of spindle 730b.

The stationary carrier 790 includes integrally formed gear support pins 790a on which second stage reduction gears 782 (one shown) are rotationally mounted with flanged bushings 794 interposed between the gear support pins 790a and the second stage reduction gears 782. The installed stationary carrier 790 bears against the outermost inner race of the pair of hub bearings 742, which in turn bear against a spacer ring 748 that bears against main housing 730. A spacer 793 and flanged washer 792 provide thrust load bearing structure and a wear resistant running surface for the second stage sun gear 763. Fluid openings 793a formed in spacer 793 ensure lubrication flow as needed. When installed, motor output shaft 725 passes through concentric openings formed in spacer 793, flanged washer 792 and second stage sun gear 763 to engage a first stage sun gear (not shown, but similar to sun gear 651) by means of splines 725a formed thereon. First stage sun gear is coupled to and driven by output shaft 725.

The pair of hub bearings 742 is disposed on spindle 730b to bear loads transmitted through an output hub and to support rotation of the output hub about the spindle 730b. The pair of hub bearings 742 is positioned radially between an outer surface of spindle 730b and an inner surface of the output hub. The pair of hub bearings 742 includes a first bearing and a second bearing that are arranged axially with respect to each other in a side-by-side manner. Stationary carrier 790 engages the second bearing, and spacer ring 748 engages the first bearing. Spacer ring 748 is positioned adjacent to the second end of spindle 730b and between the first bearing and the flange 730d of main housing 730. That is, the pair of hub bearings 742 is positioned axially between and engages (1) spacer ring 748 and (2) a combination of stationary carrier 790 and a ring gear of a planetary gear arrangement.

Spacer ring 748 is positioned between the first bearing of the pair of hub bearings 742 and main housing 730 in a manner similar to that described above with regard to FIG. 14. Spacer ring 748 includes a body and a rim extending transversely therefrom. A hub seal and a spindle seal (e.g., an O-ring seal) may engage the spacer ring 748 to facilitate creation of the fluid seals. For example, the spacer ring 748 comprises a compression face for the spindle seal and a running surface for the hub seal. The spindle seal is positioned between flange 730d of the main housing 730 and the spacer ring 748. The hub seal 528 (as shown in FIG. 14) is positioned radially between and engages the spacer ring 748 and an inner surface of the output hub.

Although only partially illustrated for clarity, the two-stage planetary gear arrangement of this optional configuration is substantially similar to the previously described planetary gear arrangement 650. For example, the two-stage planetary gear arrangement is housed within an output hub and includes a ring gear that is fixed to the output hub. A plurality of first stage planetary gears is driven by a first stage sun gear. The first stage planetary gears are supported on support pins of a planetary gear carrier and are meshed with the first stage sun gear and the ring gear. Planetary gear carrier is drivingly engaged to second stage sun gear 763, which in turn drives second stage reduction gears 782. The second stage reduction gears 782 are meshed with second stage sun gear 763 and the ring gear. The first stage planetary gears and the second stage reduction gears 782 cooperatively drive the ring gear and, in turn, the output hub.

Additionally, a hub cap or gear cover is coupled (e.g., threadably) to the output hub to cover the planetary gear arrangement and bear against the ring gear. In turn, the ring gear bears against the pair of hub bearings 742, thereby forcing the pair of hub bearings 742 to bear against the output hub in order to prevent and/or otherwise deter axial movement of the output hub.

An example reduction drive assembly comprises a housing that comprises a first housing defining a brake housing compartment, a motor stator housing, and a brake end cap defining a cylindrical volume. The example reduction drive assembly comprises a motor assembly that comprises a motor disposed in the motor stator housing and an output shaft coupled to and driven by the motor. The example reduction drive assembly comprises a planetary gear assembly driven by the output shaft. The example reduction drive assembly comprises an electric brake assembly that comprises a brake rotor disposed within the brake housing compartment and engaged to the output shaft, one or more stators disposed within the brake housing compartment adjacent to the brake rotor, a plug movably disposed in the cylindrical volume, a spring disposed within the cylindrical volume and configured to be compressed by the plug to apply a spring biasing force for pressing at least one of the one or more stators against the brake rotor, and an electric brake coil positioned adjacent to at least one of the one or more stators, the electric brake coil configured to electromagnetically move at least one of the one or more stators away from the brake rotor when energized.

In some examples, the electric brake assembly further comprises a washer positioned between and engaging the spring and at least one of the one or more stators to facilitate application of the spring biasing force to at least one of the one or more stators.

In some examples, the plug is threadably coupled to the brake end cap via threading in a threaded aperture of the cylindrical volume to facilitate loosening of the plug to reduce the spring biasing force. In some such examples, the threading enables the plug to be positioned at a location relative to the spring that causes the spring to be decompressed to eliminate the spring biasing force.

In some examples, the one or more stators includes a first stator and second stator, the brake rotor is positioned between the first stator and the second stator, the second stator is positioned between the brake rotor and the spring, and the first stator is formed of high-carbon steel to limit an amount of wear caused by the brake rotor and to prevent an electromagnetic force of the electric brake coil from moving the first stator. In some such examples, the second stator is formed of low-carbon steel, is thicker than the first stator, and is positioned adjacent to the electric brake coil to facilitate the electromagnetic force in moving the second stator.

In some examples, the one or more stators includes a first stator and a second stator between which the brake rotor is positioned, the first housing further defines a first groove and a second groove, the first stator includes a first tab received by the first groove to prevent rotation of the first stator, and the second stator includes a second tab received by the second groove to prevent rotation of the second stator. In some such examples, the first and second tabs and the first and second grooves are stepped to facilitate the second stator in being positioned between the brake rotor and the spring.

In some examples, the electric brake coil, when energized, applies an electromagnetic force that is greater than the spring biasing force to at least one of the one or more stators to release the at least one of the one or more stators from the brake rotor.

In some examples, the brake end cap defines a circumferential slot in which the electric brake coil is housed.

An example electric brake assembly for a planetary reduction drive comprises a first housing defining a brake housing compartment, first and second stators disposed within the brake housing compartment, and a rotor disposed within the brake housing compartment between the first and second stators. The rotor has a spline engaging an output shaft of a motor. The example electric brake assembly comprises a brake end cap coupled to the first housing and defining a cylindrical volume, a plug movably disposed in the cylindrical volume of the brake end cap, a spring disposed within the cylindrical volume of the brake end cap and compressed by the plug to apply a spring biasing force for pressing the second stator against the rotor, and an electric brake coil positioned adjacent to the second stator to electromagnetically pull the second stator away from the rotor when energized.

In some examples, the electric brake assembly further comprises a washer positioned between and engaging the spring and the second stator to facilitate application of the spring biasing force to the second stator.

In some examples, the plug is threadably coupled to the brake end cap via threading in a threaded aperture of the cylindrical volume to facilitate loosening of the plug to reduce the spring biasing force.

In some examples, first stator is formed of high-carbon steel to limit an amount of wear caused by the rotor and to prevent an electromagnetic force of the electric brake coil from moving the first stator. In some such examples, the second stator is formed of low-carbon steel, is positioned adjacent to the electric brake coil, and is thicker than the first stator to facilitate the electromagnetic force in moving the first stator.

In some examples, the first housing defines a first groove and a second groove, the first stator includes a first tab received by the first groove to prevent rotation of the first stator, and the second stator includes a second tab received by the second groove to prevent rotation of the second stator.

In some examples, the electric brake coil, when energized, applies an electromagnetic force that is greater than the spring biasing force to the second stator to release the second stator from the rotor.

An example electric brake assembly for a planetary reduction drive comprises a housing defining a brake housing compartment and first and second grooves and a first stator disposed within the brake housing compartment. The first stator includes a first tab received by the first groove to prevent rotation of the first stator. The example electric brake assembly comprises a second stator disposed within the brake housing compartment. The second stator includes a second tab received by the second groove to prevent rotation of the second stator. The example electric brake assembly comprises a rotor disposed within the brake housing compartment between the first and second stators. The rotor has a spline to engage an output shaft of a motor. The example electric brake assembly comprises an electric brake coil positioned adjacent to the second stator to electromagnetically pull the second stator away from the rotor when energized. The first and second tabs and the first and second grooves are stepped to facilitate positioning of the second stator between the brake rotor and the electric brake coil.

In some examples, the second tab extends radially beyond the first tab and the second groove is larger than the first groove.

In some examples, the housing further defines ribs that further facilitate positioning of the first and second stators within the brake housing compartment.

An example reduction drive assembly comprises a motor assembly comprising a motor coupled to and driving an output shaft. The example reduction drive assembly comprises a planetary gear assembly that comprises a first gear carrier comprising a first plate and a plurality of projections extending therefrom. The first plate defines a plurality of first support openings. The planetary gear assembly comprises a second gear carrier defining a plurality of second support openings and a plurality of joint openings. The plurality of joint openings receive the plurality of projections to couple the first and second gear carriers. The planetary gear assembly comprises a sun gear coupled to an end of the output shaft and disposed between the first and second gear carriers and a plurality of planet gears disposed around the sun gear between the first and second gear carriers. Each of the plurality of planet gears has a carrier pin. Each carrier pin is received by one of the plurality of first support openings and one of the plurality of second support openings to retain the planet gears between the first and second gear carriers.

In some examples, each carrier pin is received by one of the plurality of first support openings and one of the plurality of second support openings via press fit to retain a respective one of the plurality of planet gears between the first and second gear carriers.

In some examples, each of the plurality of projections is swaged to secure the first gear carrier to the second gear carrier via a swaged connection.

In some examples, the sun gear defines an axial opening having an interior spline that receives an exterior spline at the end of the output shaft to couple the sun gear to the output shaft.

In some examples, the first gear carrier further comprises a plurality of first protrusions extending from the first plate and from which the plurality of projections extend and the second gear carrier comprises a plurality of second protrusions that define the plurality of joint openings. In such examples, the plurality of first protrusions and the plurality of second protrusions extend around the sun gear and the planet gears to enable the first and second gear carriers to couple together.

An example planetary gear assembly comprises a first gear carrier comprising a first plate and a plurality of projections extending therefrom. The first plate defines a plurality of first support openings. The example planetary gear assembly comprises a second gear carrier coupled to the first gear carrier. The second gear carrier defines a plurality of second support openings and a plurality of joint openings. The plurality of joint openings receive the plurality of projections to couple the first and second gear carriers together. The example planetary gear assembly comprises a sun gear disposed between the first and second gear carriers and coupled to an end of a output shaft of a motor, a plurality of planet gears disposed around and engaging the sun gear between the first and second gear carriers, and a plurality of carrier pins configured extending axially from the plurality of planet gears. The plurality of carrier pins are received by the plurality of first support openings and the plurality of second support openings to retain the plurality of planet gears between the first and second gear carriers.

In some examples, the plurality of projections are integrally formed within the first plate to enable the first gear carrier to be coupled to the second gear carrier without separate fasteners.

In some examples, the plurality of carrier pins, the plurality of first support openings, and the plurality of second support openings are sized to enable the plurality of carrier pins to be received by the plurality of first support openings and the plurality of second support openings via press fit.

In some examples, the first gear carrier defines a first plurality of relief slits. In such examples, each of the first plurality of relief slits is formed in one of the plurality of first support openings to deter cracks from forming when the carrier pin of a respective one of the plurality of planet gears is received via press fit. In some such examples, the second gear carrier defines a second plurality of relief slits. In such examples, each of the second plurality of relief slits is formed in one of the plurality of second support openings to deter cracks from forming when the carrier pin of a respective one of the plurality of planet gears is received via press fit.

In some examples, each of the plurality of projections is swaged to secure the first gear carrier to the second gear carrier via a swaged connection.

In some examples, the sun gear defines a first axial opening having an interior spline for coupling to the output shaft of the motor. In such examples, the first gear carrier or the second gear carrier defines a second axial opening that enables the output shaft of the motor to extend to the sun gear positioned between the first and second gear carriers.

In some examples, each of the plurality of planet gears comprises a first stage gear and a second stage gear adjacent the first stage gear. In such examples, the second stage gear has a smaller outer diameter than that of the first stage gear. In some such examples, the first stage gear of each of the plurality of planet gears is meshed with the sun gear.

In some examples, the first gear carrier further comprises a plurality of first protrusions extending from the first plate and from which the plurality of projections extend and the second gear carrier comprises a plurality of second protrusions that define the plurality of joint openings. In such examples, the plurality of first protrusions and the plurality of second protrusions extend around the sun gear and the plurality of planet gears disposed between the first and second gear carriers to enable the first and second gear carriers to couple together. In some such examples, each of the plurality of projections extends from a respective one of the plurality of first protrusions and each of the plurality of second protrusions defines a respective one of the plurality of joint openings.

An example method for assembling a planetary gear assembly comprises extending carrier pins axially through respective planet gears, positioning the planet gears around a sun gear such that the planet gears engage the sun gear, and positioning the planet gears and the sun gear between a first gear carrier and a second gear carrier. The first gear carrier comprises projections and defining a plurality of first support openings. The second gear carrier defines a plurality of second support openings and a plurality of joint openings. The example method comprises retaining the planet gears between the first and second gear carriers by extending the carrier pins into the plurality of first and second support openings. The example method comprises fixedly coupling the first gear carrier to the second gear carrier without separate fasteners by extending the projections of the first gear carrier into the plurality of joint openings of the second gear carrier.

In some examples, extending the carrier pins into the plurality of first and second support openings comprises press fitting the carrier pins into the plurality of first and second support openings.

In some examples, coupling the first and second gear carriers together further comprises swaging the projections of the first gear carrier upon extending the projections through the plurality of joint openings of the second gear carrier.

Some examples further comprise coupling the sun gear to an end of an output shaft of a motor. In such examples, the sun gear comprises an interior spline that engages an exterior spline of the output shaft for coupling the sun gear to the output shaft.

Some examples further comprise, for each of the planet gears, coupling a first stage gear to a second stage gear via slip or press fit. In such examples, the second stage gear has a smaller diameter than the first stage gear. In some examples, positioning the planet gears around the sun gear includes meshing the first stage gear of each of the planet gears with the sun gear.

An example electrical connector for a reduction drive assembly comprises a connector body and a plurality of pins disposed within the connector body. The plurality of pins comprises one or more motor pins to conduct power to an electric motor, one or more brake pins to conduct power to an electric brake coil, and one or more sensor pins electrically connected to a sensor board for control of the electric motor.

In some examples, the connector body includes threads for threaded coupling to a jam nut to couple the connector body to an electrical compartment cover.

In some examples, the one or more motor pins include a first pin for a first phase of the electric motor, a second pin for a second phase of the electric motor, and a third pin for a third phase of the electric motor.

In some examples, the one or more brake pins include a power pin and a ground pin.

In some examples, the one or more sensor pins include a first pin for a first Hall-effect sensor, a second pin for a second Hall-effect sensor, a third pin for a third Hall-effect sensor, a fourth pin for a temperature sensor, a fifth pin for grounding the sensor board, and a sixth pin for supplying power to the sensor board.

Some examples further comprise a brake connector coupled to the electric brake coil and electrical wiring connecting the brake connector to the one or more brake pins.

Some examples further comprise a board connector coupled to the sensor board and electrical wiring connecting the board connector to the one or more sensor pins.

In some examples, the connector body defines one or more apertures through which the one or more motor pins are configured to extend. In some such examples, the one or more motor pins are detachable from the connector body through the one or more apertures. In some examples, the one or more motor pins are fixed to the connector body. In some examples, the one or more brake pins and the one or more sensor pins are fixed to the connector body.

An example electric connection assembly of a reduction drive assembly comprises an electrical compartment integrally formed with a housing of the reduction drive assembly and an electrical compartment cover defining a mounting opening and removably coupled to the electrical compartment. The example electric connection assembly comprises an electrical connector that is housed in the electrical compartment, partially extends through the mounting opening, and is mounted to the compartment cover. The electrical connector comprises a connector body and a plurality of pins disposed within the connector body. The plurality of pins comprises motor pins to conduct power to an electric motor, brake pins to conduct power to an electric brake coil, and sensor pins electrically connected to a sensor board for control of the electric motor.

Some examples further comprise fasteners for coupling the electrical compartment cover to the electrical compartment.

In some examples, the electrical compartment cover includes one or more guard walls adjacent to the mounting opening to protect the electrical connector. In some such examples, to protect the electrical connector, the one or more guard walls have a height that extends beyond the electrical connector. In some such examples, the one more guard walls are spaced apart from the mounting opening by a distance that provides access to the electrical connector to enable a person to attach or detach the electrical connector from the electrical compartment cover.

Some examples further comprise an outer gasket positioned between the electrical compartment and the electrical compartment cover. Some such examples further comprise an inner gasket that engages an inner surface of the electrical compartment cover about the mounting opening to form a seal between the electrical connector and the electrical compartment cover. In some such examples, the electrical compartment cover defines an outer groove in which the outer gasket is at least partially positioned. In some such examples, the electrical compartment cover includes a perimeter rim that defines an interface surface and the electrical compartment defines a mating surface. In such examples, the interface surface and the mating surface are configured to limit compression of the outer gasket positioned between the electrical compartment and the electrical compartment cover. Further, in some such examples, the perimeter rim of the electrical compartment cover is configured to overlap with a raised seal surface of the electrical compartment to facilitate alignment between the electrical compartment cover and the electrical compartment and to protect the outer gasket positioned between the electrical compartment cover and the electrical compartment.

In some examples, the connector body defines one or more apertures through which the motor pins extend, the motor pins are detachable from the connector body through the one or more apertures, and the brake pins and the sensor pins being fixed to the connector body.

In some examples, the connector body defines one or more apertures through which the motor pins extend. In such examples, the motor pins, the brake pins, and the sensor pins are fixed to the connector body.

An example reduction drive assembly comprises a housing that comprises a spindle having a first end and a second end opposite the first end. The spindle defines an aperture that extends axially between the first end and the second end. The housing comprises a flange extending radially outward from the second end of the spindle. Outer surfaces of the spindle and the flange form at least one fillet corner. The example reduction drive assembly comprises a motor output shaft coupled to and driven by a motor. The motor output shaft extends through the aperture of the spindle. The example reduction drive assembly comprises a planetary gear assembly that comprises a sun gear coupled to and driven by the motor output shaft and a plurality of planet gears meshed with and driven by the sun gear. Each of the plurality of planet gears has a first stage gear and a second stage gear. The example reduction drive assembly comprises a fixed ring gear coupled to the first end of the spindle and housing the second stage gear. The fixed ring gear is meshed with the second stage gear of each of the plurality of planet gears. The example reduction drive assembly comprises an output hub, a rotating ring gear coupled to the output hub and meshed with the first stage gear of each of the plurality of planet gears to cause the output hub to rotate about the spindle of the housing, a set of bearings positioned radially between an outer surface of the spindle and an inner surface of the output hub and axially between the fixed ring gear and the flange of the housing to facilitate rotation of the output hub, and a spacer ring positioned between the spindle flange and the set of bearings and adjacent the at least one fillet corner to reduce stress of the housing.

In some examples, the set of bearings includes a first bearing and a second bearing that contact each other. In such examples, the first bearing further contacts the spacer ring and the second bearing further contacts the fixed ring gear.

In some examples, an outer surface of each bearing of the set of bearings contacts the inner surface of the output hub and an inner surface of each bearing of the set of bearings contacts the outer surface of the spindle.

Some examples further comprise a third bearing disposed in the aperture of the spindle about the motor output shaft and adjacent an inner surface of the spindle.

In some examples, the fixed ring gear is disposed in the output hub and the planetary gear assembly is at least partially disposed in the output hub.

In some examples, the output hub has a first hub end that extends beyond the fixed ring gear and a second hub end that extends toward the flange of the housing. Some such examples further comprise a hub cap coupled to the first hub end to cover the planetary gear assembly. Further, in some such examples, the hub cap defines through holes and the first hub end defines threaded holes that receive threaded fasteners to couple the hub cap to the output hub.

In some examples, the first end of the spindle defines threaded holes, the fixed ring gear defines mounting holes, and the mounting holes align with the threaded holes to receive threaded fasteners that couple the fixed ring gear to the spindle.

In some examples, the flange of the housing defines mounting holes for attaching the reduction drive assembly to a frame structure.

An example reduction drive assembly comprises a housing that comprises a spindle having a first end and a second end opposite the first end. The spindle defines an aperture that extends axially between the first end and the second end. The housing comprises a flange extending radially outward from the second end of the spindle. The example reduction drive assembly comprises a motor output shaft coupled to and driven by a motor. The motor output shaft extends through the aperture of the spindle. The example reduction drive assembly comprises a planetary gear assembly that comprises a sun gear coupled to and driven by the motor output shaft and a plurality of planet gears meshed with and driven by the sun gear. Each of the plurality of planet gears has a first stage gear and a second stage gear. The example reduction drive assembly comprises a fixed ring gear coupled to the first end of the spindle and housing the second stage gear. The fixed ring gear is meshed with the second stage gear of each of the plurality of planet gears. The example reduction drive assembly comprises an output hub, a rotating ring gear coupled to the output hub and meshed with the first stage gear of each of the plurality of planet gears to cause the output hub to rotate about the spindle of the housing, a set of bearings positioned radially between an outer surface of the spindle and an inner surface of the output hub and axially between the fixed ring gear and the flange of the housing to facilitate rotation of the output hub, and a spacer ring including a body and a rim that extends from the body. The spacer ring is positioned between and engages the set of bearings and the housing to reduce stress of the housing.

Some examples further comprise an O-ring seal positioned between the flange of the housing, the body of the spacer ring, and the rim of the spacer ring.

Some examples further comprise a hub seal positioned radially between and engaging the spacer ring and the inner surface of the output hub. Some such examples further comprise a first retaining ring and a second retaining ring. In such examples, the hub seal is positioned axially between the first and second retaining rings. Further, in some such examples, the first retaining ring engages the inner surface of the output hub. Further, in some such examples, the second retaining ring is positioned between the hub seal and one bearing of the set of bearings. In such examples, the second retaining ring is positioned in a retaining ring groove defined along the inner surface of the output hub.

In some examples, the set of bearings includes a first bearing and a second bearing that contact each other. In such examples, the first bearing further contacts the spacer ring and the second bearing further contacts the fixed ring gear.

An example reduction drive assembly comprises a spindle having a first end and a second end opposite the first end. The spindle defines an aperture that extends axially between the first end and the second end. The example reduction drive assembly comprises a motor output shaft coupled to and driven by a motor. The motor output shaft extends through the aperture of the spindle. The example reduction drive assembly comprises an output hub configured to rotate about the spindle and a planetary gear assembly housed within the output hub. The planetary gear assembly comprises a ring gear fixed to the output hub, a first stage sun gear coupled to and driven by the motor output shaft, a second stage sun gear, a planetary gear carrier engaged to the second stage sun gear and having support pins, first stage planetary gears each of which is supported by a respective one of the support pins of the planetary gear carrier and meshed with the first stage sun gear and the ring gear, carrier pins extending from the first end of the spindle, and second stage reduction gears each of which is rotationally mounted on a respective one of the carrier pins and is meshed with the second stage sun gear and the ring gear.

In some examples, the first stage planetary gears and the second stage reduction gears are configured to cooperatively drive the ring gear to drive the output hub.

Some examples further comprise a set of bearings positioned radially between an outer surface of the spindle and an inner surface of the output hub. In such examples, the set of bearings comprises a first bearing and a second bearing that are arranged axially in a side-by-side manner. Some such examples further comprise a housing that comprises the spindle and a flange. In such examples, the flange extends radially outward from the second end of the spindle. Further, some such examples further comprise a spacer ring positioned between the first bearing and the flange. Further, some such examples further comprise fasteners received by bores at the first end of the spindle. Moreover, in some such examples, the fasteners engage the second bearing to clamp the set of bearings against the flange of the housing. In some such examples, the set of bearings is positioned axially between a spacer ring positioned adjacent to the second end of the spindle and fasteners extending from the first end of the spindle.

Some examples further comprise a hub cap threadably coupled to the output hub to cover the planetary gear assembly. In some such examples, when coupled to the output hub, the hub cap is configured to push the ring gear to deter axial movement of the output hub relative to the spindle.

Some examples further comprise a magnet carrier mounted within the aperture at the first end of the spindle. In some such examples, the magnet carrier retains a plurality of magnets. In some such examples, the magnet carrier includes a lip that extends beyond the first end of the spindle. Such examples further comprise at least one washer positioned between and engaging at least one of the second stage reduction gears and the lip of the magnet carrier to retain the magnet carrier within the aperture at the first end of the spindle.

An example reduction drive assembly comprises a spindle having a first end and a second end opposite the first end. The spindle defines an aperture that extends axially between the first end and the second end. The example reduction drive assembly comprises a motor output shaft coupled to and driven by a motor. The motor output shaft extends through the aperture of the spindle. The example reduction drive assembly comprises an output hub configured to rotate about the spindle and a planetary gear assembly housed within the output hub. The planetary gear assembly comprises a ring gear fixed to the output hub, a first stage sun gear coupled to and driven by the motor output shaft, a second stage sun gear, a planetary gear carrier engaged to the second stage sun gear and having first support pins, first stage planetary gears each of which is supported by a respective one of the first support pins of the planetary gear carrier and meshed with the first stage sun gear and the ring gear, a stationary carrier coupled to the first end of the spindle and having second support pins, and second stage reduction gears each of which is rotationally mounted on a respective one of the second support pins and is meshed with the second stage sun gear and the ring gear.

In some examples, the first end of the spindle defines a pilot to facilitate the stationary carrier in coupling to the first end of the spindle.

Some examples further comprise a set of bearings positioned radially between an outer surface of the spindle and an inner surface of the output hub. In such examples, the set of bearings comprises a first bearing and a second bearing that are arranged axially in a side-by-side manner. Some such examples further comprise a housing that comprises the spindle and a flange. In such examples, the flange extends radially outward from the second end of the spindle. Further, some such examples further comprise a spacer ring positioned between the first bearing and the flange. Further, in some such examples, the stationary carrier engages the second bearing to press the set of bearings against the flange of the housing. In some such examples the set of bearings is positioned axially between a spacer ring that is adjacent to the second end of the spindle and the stationary carrier that is adjacent to the first end of the spindle.

Some examples further comprise a hub cap coupled to the output hub to cover the planetary gear assembly. In some such examples, when coupled to the output hub, the hub cap is configured to push the ring gear to deter axial movement of the output hub relative to the spindle.

Some examples further comprise a spacer and a washer positioned between the second stage sun gear and the first end of the spindle.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. An electric connection assembly of a reduction drive assembly, comprising:
   an electrical compartment connected with a housing of the reduction drive assembly;
   an electrical compartment cover defining a mounting opening and removably coupled to the electrical compartment; and
   an electrical connector that is housed in the electrical compartment, partially extends through the mounting opening, and is mounted to the compartment cover, the electrical connector comprising:
      a connector body; and
      a plurality of pins disposed within the connector body and comprising:
         one or more motor pins to conduct power to an electric motor;
         one or more brake pins to conduct power to an electric brake coil; and
         one or more sensor pins electrically connected to a sensor board for control of the electric motor.

2. The electric connection assembly of claim 1, further comprising fasteners for coupling the electrical compartment cover to the electrical compartment.

3. The electric connection assembly of claim 1, wherein the electrical compartment cover includes one or more guard walls adjacent to the mounting opening to protect the electrical connector.

4. The electric connection assembly of claim 3, wherein, to protect the electrical connector, the one or more guard walls have a height that extends beyond the electrical connector.

5. The electric connection assembly of claim 3, wherein the one or more guard walls are spaced apart from the mounting opening by a distance that provides access to the electrical connector to enable a person to attach or detach the electrical connector from the electrical compartment cover.

6. The electric connection assembly of claim 1, further comprising an outer gasket positioned between the electrical compartment and the electrical compartment cover.

7. The electric connection assembly of claim 6, further comprising an inner gasket that engages an inner surface of the electrical compartment cover about the mounting opening to form a seal between the electrical connector and the electrical compartment cover.

8. The electric connection assembly of claim 6, wherein the electrical compartment cover defines an outer groove in which the outer gasket is at least partially positioned.

9. The electric connection assembly of claim 6, wherein the electrical compartment cover includes a perimeter rim that defines an interface surface and the electrical compartment defines a mating surface, the interface surface and the mating surface being configured to limit compression of the outer gasket positioned between the electrical compartment and the electrical compartment cover.

10. The electric connection assembly of claim 9, wherein the perimeter rim of the electrical compartment cover is configured to overlap with a raised seal surface of the electrical compartment to facilitate alignment between the electrical compartment cover and the electrical compartment and to protect the outer gasket positioned between the electrical compartment cover and the electrical compartment.

11. The electric connection assembly of claim 1, wherein the connector body defines one or more apertures through which the one or more motor pins extend, the one or more motor pins being detachable from the connector body through the one or more apertures, the one or more brake pins and the one or more sensor pins being fixed to the connector body.

12. The electric connection assembly of claim 1, wherein the connector body defines one or more apertures through which the one or more motor pins extend, the one or more motor pins, the one or more brake pins, and the one or more sensor pins being fixed to the connector body.

13. The electric connection assembly of claim 1, wherein the connector body includes threads for threaded coupling to a jam nut to couple the connector body to the electrical compartment cover.

14. The electric connection assembly of claim 1, wherein the one or more motor pins include a first pin for a first phase of the electric motor, a second pin for a second phase of the electric motor, and a third pin for a third phase of the electric motor.

15. The electric connection assembly of claim 1, wherein the one or more brake pins include a power pin and a ground pin.

16. The electric connection assembly of claim 1, wherein the one or more sensor pins include a first pin for a first Hall-effect sensor, a second pin for a second Hall-effect sensor, a third pin for a third Hall-effect sensor, a fourth pin for a temperature sensor, a fifth pin for grounding the sensor board, and a sixth pin for supplying power to the sensor board.

17. The electric connection assembly of claim 1, further comprising:
a brake connector coupled to the electric brake coil; and
electrical wiring connecting the brake connector to the one or more brake pins.

18. The electric connection assembly of claim 1, further comprising:
a board connector coupled to the sensor board; and
electrical wiring connecting the board connector to the one or more sensor pins.

19. The electric connection assembly of claim 1, wherein the connector body defines one or more apertures through which the one or more motor pins are configured to extend.

20. The electric connection assembly of claim 19, wherein the one or more motor pins are detachable from the connector body through the one or more apertures.

21. The electric connection assembly of claim 19, wherein the one or more motor pins are fixed to the connector body.

22. The electric connection assembly of claim 19, wherein the one or more brake pins and the one or more sensor pins are fixed to the connector body.

\* \* \* \* \*